(12) United States Patent
Ando et al.

(10) Patent No.: US 6,636,687 B1
(45) Date of Patent: Oct. 21, 2003

(54) INTEGRATED RECORDING AND EDITING APPARATUS AND SYSTEM

(76) Inventors: Hideki Ando, Kanagawa (JP); Seiichi Sakai, Tokyo (JP); Norihiko Noguchi, Kanagawa (JP)

( * ) Notice: Subject to any disclaimer, the term of this patent is extended or adjusted under 35 U.S.C. 154(b) by 0 days.

(21) Appl. No.: 09/150,265

(22) Filed: Sep. 9, 1998

(30) Foreign Application Priority Data

Sep. 11, 1997 (JP) .......................................... P09-245861

(51) Int. Cl.[7] .......................... H04N 5/93; H04N 5/781; H04N 5/85; H04N 5/90; H04N 5/91
(52) U.S. Cl. ............................ 386/55; 386/52; 386/125
(58) Field of Search ........................... 386/117, 52, 55; 358/906, 909.1; 345/723; 348/232, 207, 239

(56) References Cited

U.S. PATENT DOCUMENTS

| | | | | |
|---|---|---|---|---|
| 4,789,979 A | * | 12/1988 | Hiraoka et al. | ........... 369/275.4 |
| 5,400,315 A | * | 3/1995 | Koishi et al. | ................ 369/124 |
| 5,656,348 A | * | 8/1997 | Kudo et al. | |
| 5,666,462 A | * | 9/1997 | Park | .............................. 386/125 |
| 5,771,330 A | * | 6/1998 | Takano et al. | .................. 386/52 |
| 5,862,123 A | * | 1/1999 | Horie et al. | ............. 369/275.1 |
| 5,930,446 A | * | 7/1999 | Kanda | ........................... 386/52 |
| 6,016,380 A | * | 1/2000 | Norton | ......................... 386/52 |
| 6,052,508 A | * | 4/2000 | Mincy et al. | .................. 386/96 |
| 6,085,020 A | * | 7/2000 | Saito et al. | ..................... 386/54 |
| 6,157,771 A | * | 12/2000 | Brewer et al. | ................. 386/69 |
| 6,201,925 B1 | * | 3/2001 | Brewer et al. | ................. 386/52 |
| 6,262,777 B1 | * | 7/2001 | Brewer et al. | .............. 348/515 |
| 6,285,361 B1 | * | 9/2001 | Brewer et al. | .............. 345/328 |

FOREIGN PATENT DOCUMENTS

GB 2225147 A * 5/1990

* cited by examiner

*Primary Examiner*—Andrew Christensen
*Assistant Examiner*—Polin Chieu

(57) ABSTRACT

A field editing system for editing materials in a material collecting place. Data for management of digital video and audio signals and data of an edit list are recorded on a disc-like recording medium together with the digital video and audio signals. Collected materials can be processed on the common disc-like recording medium from image pickup to editing.

10 Claims, 20 Drawing Sheets

INTEGRATED RECORDING AND EDITING APPARATUS AND SYSTEM

BACKGROUND OF THE INVENTION

1. Field of the Invention

The present invention relates to an editing apparatus and an editing system. For example, the present invention can be applied to a field editing system in which a broadcast program or the like made of materials collected on the spot is edited. The present invention can improve handling of a system of this kind in such a manner that data for management of video and audio signals and data of an edit list are recorded on a disc-like recording medium together with the video and audio signals to enable the process from image pickup to editing to be performed on the one disc-like recording medium.

2. Description of the Related Art

Conventionally, in a place for collection of materials, e.g., a field outside a broadcasting station, a television program or the like made of collected materials is edited by a simple editing system to immediately broadcast the edition result. Such an editing system is arranged to achieve efficient editing by using a process in which materials collected on a magnetic tape are temporarily recorded on an intermediate recording medium formed of a hard disk.

That is, in a case where collected materials are edited in a field by processing using two video tape recorders, i.e., by so-called AB-roll editing, a substantially long time is required for operations for fast-forward feeding and rewinding a magnetic tape, cueing desired cuts, and so on, so that the overall editing time is considerably long.

In an editing system with an intermediate recording medium arranged to solve this problem, video and audio signals recorded on a magnetic tape by, for example, an integrated video camera-tape recorder are dubbed on a hard disk. An edit list is made by setting editting points with respect to the video and audio signals reproduced from the hard disk, and the video and audio signals recorded on the hard disk are then recorded on a magnetic tape in accordance with this edit list.

This editing system requires an edit point setting time markedly shorter than that required by the AB-roll editing system using magnetic tapes and, therefore, enables collected news materials to be broadcast in a shorter time.

In this editing system, however, a considerably long time is required to dub, on an intermediate recording medium, video and audio signals recorded on a magnetic tape. For example, in a case where collected materials having a length of 30 minutes are recorded on a quad-speed hard disk, a time period of seven minutes and thirty seconds is required for recording on the hard disk.

Moreover, a considerably long time is required to rerecord the results of editing on the magnetic tape before the magnetic tape is brought back to the broadcasting station.

It is thought that this kind of system can be handled more easily and conveniently if the these time periods are reduced to enable collected materials to be processed more efficiently.

SUMMARY OF THE INVENTION

In view of the above-described circumstances, an object of the present invention is to provide an image pickup apparatus, an editing apparatus and an editing system arranged to process collected materials more efficiently than those based on the conventional art.

To achieve this object, according to one aspect of the present invention, there is provided and image pickup apparatus having recording means for recording video and audio signals on a disc-like recording medium detachably held. An information recording surface of the disc-like recording medium is divided into at least two concentric areas, one of which includes an edit list recording area and a management data recording area. The video and audio signals are recorded in the divided concentric area other than that including the edit list recording area and the management data recording area. Data for management of the video and audio signals is recorded in the management data recording area.

According to another aspect of the present invention, there is provided an editing apparatus which records an edit list in an edit list recording area corresponding to one of divided areas of a disc-like recording medium on which management data and video and audio signals are recorded.

According to still another aspect of the present invention, there is provided an editing system including an image pickup apparatus in which an information recording surface of a disc-like recording medium is divided into at least two concentric areas, one of which includes an edit list recording area and a management data recording area, and in the other of which video and audio signals are recorded, data for management of the video and audio signals being recorded in the management data recording area. The editing system also includes an editing apparatus in which an edit list is recorded in the edit list recording area.

According to the present invention, an information recording surface of one disc-like recording medium is divided into concentric areas, which include an edit list recording area and a management data recording area. Data for management of video and audio signals is recorded in the management data recording area, and an edit list is recorded in the edit list recording area. Disc-like recording medium thus formed can be used in common through the process from image pickup to editing to process the video and audio signals.

DESCRIPTION OF THE PREFERRED EMBODIMENTS

(1-1) First Embodiment

Figure 1:
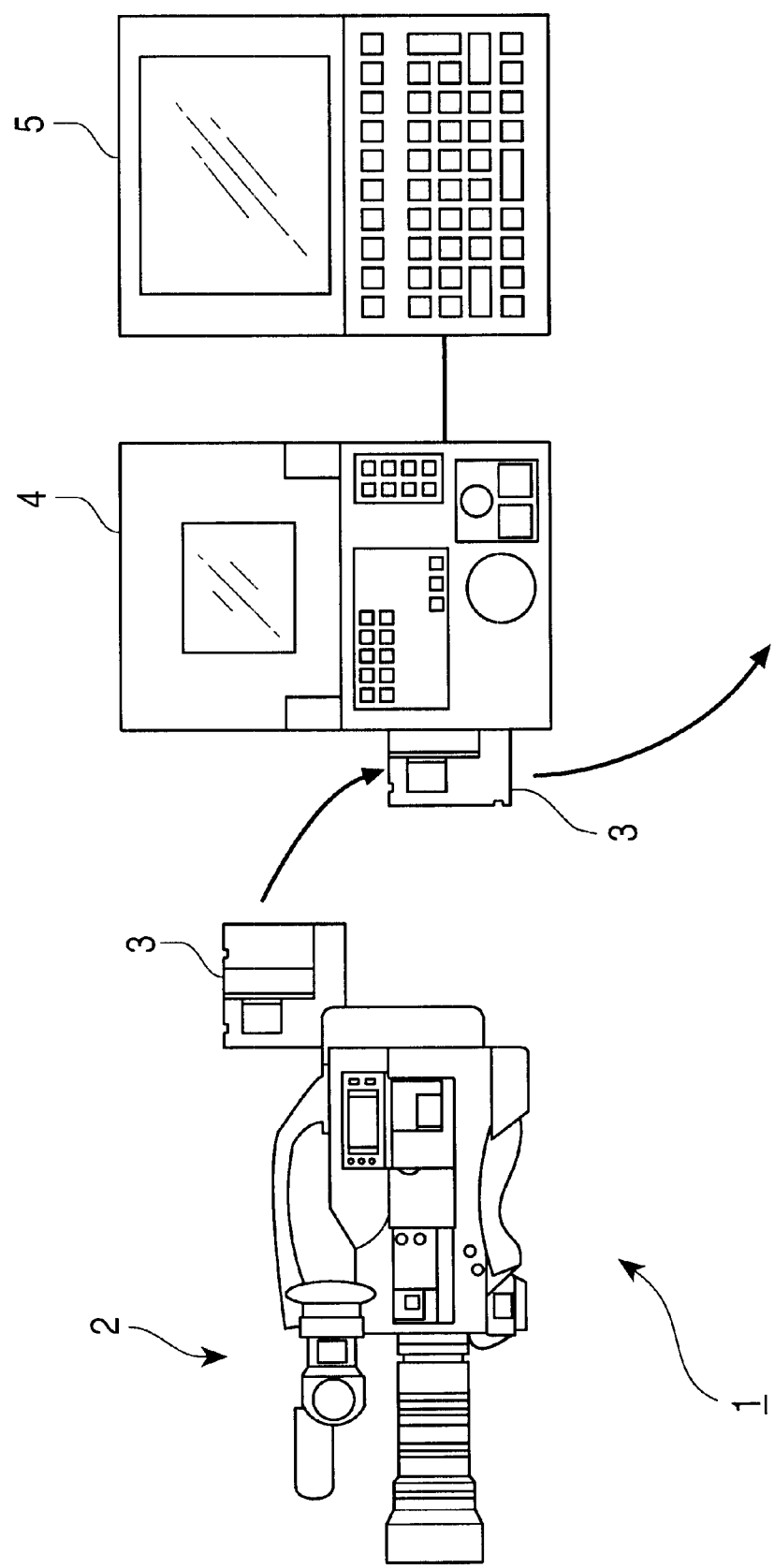
FIG. 1 is a plan view of an editing system which represents a first embodiment of the present invention.

FIG. 1 is a plan view showing an editing system 1 which represents a first embodiment of the present invention. In this editing system 1, digital video and audio signals representing collected materials are recorded on an optical disc 3 by using a television camera 2. When collection of materials is finished, the optical disc 3 is removed from the television camera 2 and is loaded in, for example, a viewer 4 mounted in a motor vehicle. The viewer 4 is operated under the control of a personal computer 5 to reproduce digital video and audio signals recorded on the optical disc 3 and to record an edit list of the digital video and audio signals on the optical disc 3.

In this editing system 1, the optical disc 3 is brought back to a broadcasting station and the results of editing of collected materials recorded on the optical disc 3 can then be broadcast immediately in accordance with the edit list recorded on the optical disc 3. Alternatively, the result of editing can be directly transmitted from the viewer 4 to a broadcasting station via a satellite news gathering (SNG) line or the like if necessary.

Figure 2:
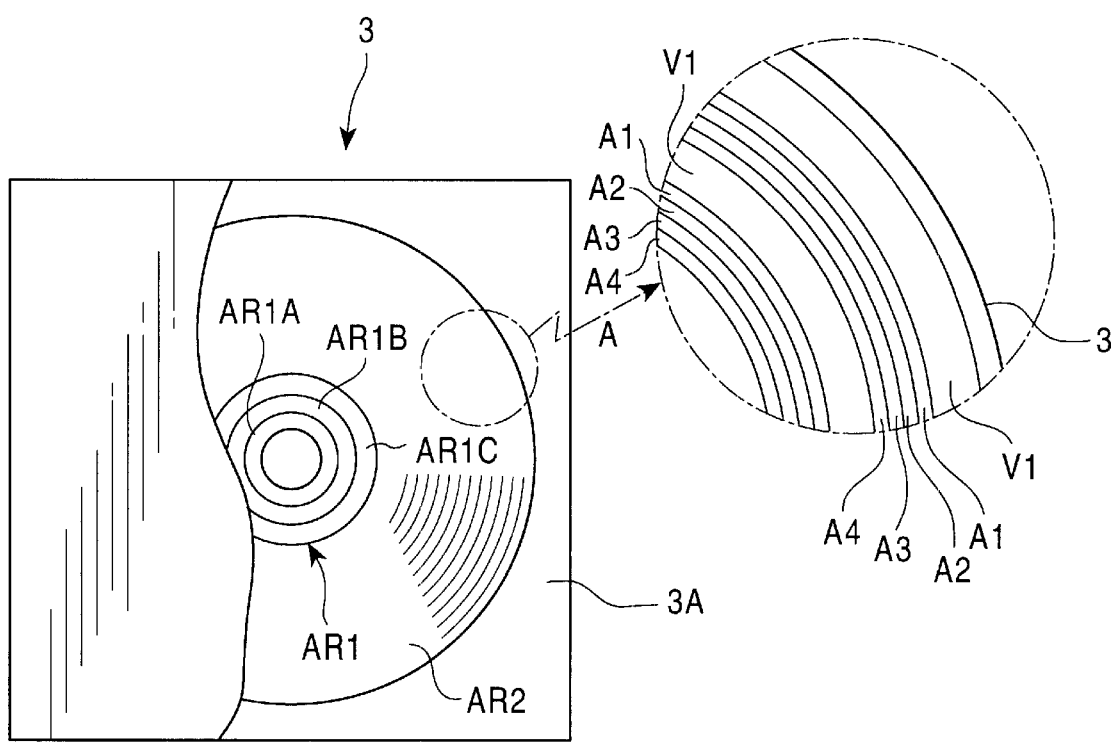
FIG. 2 is a plan view of an optical disc used in the editing system shown in FIG. 1.

FIG. 2 is a plan view of optical disc 3 used in the system 1. Optical disc 3 is accommodated in a predetermined cartridge 3A and is suitably supported in the same. Dust or the like is effectively stopped from entering the cartridge 3A. Optical disc 3 and cartridge 3A are formed so that, when they are loaded in an apparatus such as television camera 2 or viewer 4, a shutter provided on the cartridge 3A is slid to expose an information recording surface, enabling access from the television camera 2 or viewer 4 to the recording surface.

Optical disc 3 is formed of a rewritable phase-change optical disc having information recording surfaces formed on opposite sides, in each of which a pre-groove serving which is a groove for guiding a laser beam is formed in a meandering manner. Optical disc 3 is driven to rotate so that the meandering period of the pre-groove with respect to a laser beam irradiation position is constant, thereby enabling optical disc 3 to be driven on the condition of rotation at a constant linear velocity. On one side of optical disc 3, the pre-groove is formed so as to wind clockwise from the outer circular end to the inner circular end of the recording area as viewed from the same side. On the other side of optical disc 3, the pre-groove is formed so as to wind counterclockwise from the outer circular end to the inner circular end of the recording area. Each of a pair of optical pickups disposed so as to face the two surfaces of optical disc 3 can be moved from the outer circular end to the inner circular end of the recording area to successively displace the laser beam irradiation position along the pre-groove in the corresponding surface.

A system data area AR1 is formed adjacent to the inner end of each recording area of optical disc 3. The system data area AR1 is divided into three concentric areas AR1A, AR1B, and AR1C. Management data is recorded in the innermost area AR1A when optical disc 3 is manufactured. This management data includes an optimum quantity of light at the time of recording of data on optical disc 3, a common serial number for a group of optical discs 3, and individual identification data assigned to the corresponding optical disc 3.

Data for management of digital video signals recorded on optical disc 3 is recorded in the area AR1B on the outer circumferential side of the area AR1A. This management data includes address information formed of recording start positions and recording end portions of digital video and audio signals for files, time codes for recording start points and recording end points, data for identification as to whether each file is an editable file set by a cameraman, and data on image pickup conditions. Data on image pickup conditions includes a time when image pickup operation is performed, a place where image pickup operation is performed, a name of a cameraman, and television camera setting data. As television camera setting data, data on the white balance, gain, audio signal level, aperture, etc., set in television camera 2 is recorded. From such management data recorded in the area AR1B of optical disc 3, records of files recorded on optical disc 3 can be confirmed.

In the next outer area AR1C, data for editing is recorded. This editing data is recorded in the form of a file as an edit list for editing files recorded on optical disc 3. The edit list is formed of data on edit points which are set with respect to each file. This edit point data is recorded by designating a reproduction order with time codes and addresses, with addition of transition forms (e.g., cut-editing, cross-fading, etc.). From optical disc 3, the desired edit list can be selected and recorded collected materials can be successively reproduced in accordance with the selected edit list.

The area AR1B for recording of data for management of digital video signals recorded on optical disc 3 and the area AR1C for recording of editing data are provided on one of the two sides of optical disc 3.

An outer area AR2 is allotted as a user area in which digital video and audio signals are recorded. The user area AR2 is zoned into twenty-six concentric zones having pre-bits formed between pre-groove portions radially adjacent to each other. In the innermost zone, nineteen sectors are allotted per round. The number of sectors per round is successively increased from the innermost zone to the outermost zones. In the outermost zone, forty-five sectors are allotted per round.

In the user area AR2, regardless of this zoning, the recording area is concentrically divided as shown in an enlarged view of a portion indicated by A in FIG. 2. An outer portion of each of the divided concentric areas is formed as a recording area for digital video signal V1. An inner portion of each of the divided concentric areas is further divided into recording areas for digital audio signals A1 to A4 in four channels corresponding to the digital video signal recorded in the outer recording area. In optical disc 3, therefore, various sounds, e.g., sounds from an object and surrounding things when a picture of the objected is taken (hereinafter referred to as environmental sounds), announcer's explanatory speech, explanatory speech in some of various languages, and background music can be recorded along with the corresponding digital video signal.

Figure 3:
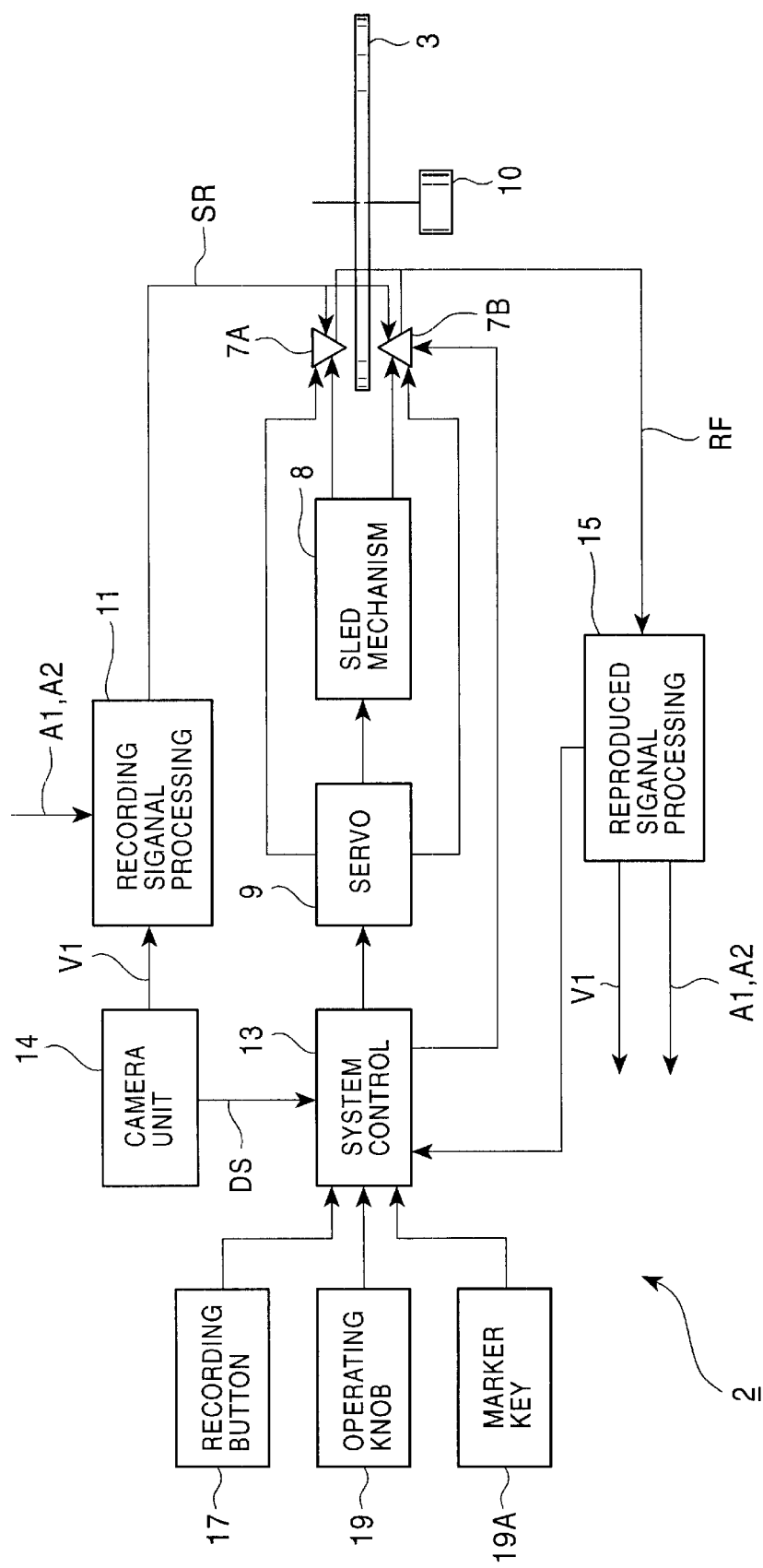
FIG. 3 is a block diagram of a television camera in the editing system shown in FIG. 1.

FIG. 3 is a block diagram of the television camera 2. In the television camera 2, optical disc 3 is detachably held, a digital video signal is recorded on optical disk 3, and digital audio signals representing environmental sounds, announcer' speech and the like, accompanying the digital video signal, are also recorded.

That is, in the television camera 2, optical pickups 7A and 7B are held so as to be face the two surfaces of optical disc 3, and a sled mechanism 8 can move the optical pickups 7A and 7B in a radial direction of optical disc 3 under the control of a servo circuit 9 while maintaining the optical pickups 7A and 7B in a linked relationship with each other. Thus, in the television camera 2, the optical pickups 7A and 7B linked to each other can be moved in a radial direction of optical disc 3 to access any track selected as desired.

Each of the optical pickups 7A and 7B irradiates optical disc 3 with a laser beam and receives light returned from optical disc 3 to form and output a tracking error signal which changes in level according to a tracking error amount, a focus error signal which changes in level according to a focus error amount, and a wobble signal which changes in level according to meandering of the groove, and a reproduced signal RF which changes in level according to the quantity of returned light.

Each of the optical pickups 7A and 7B also outputs a laser beam quantity monitoring signal which changes in level according to the quantity of laser beam light. The servo circuit 9 performs control based on the level of the monitoring signal such as to intermittently increase the quantity of laser beam light from a quantity at the time of reproduction to an optimum quantity for formation of pits according to a drive signal SR output from a recording signal processing circuit 11, etc.

The television camera 2 intermittently increases the quantity of laser beam light in this manner to perform thermal recording of desired data in an area unused for recording on optical disc 3.

During this data recording, the optical pickups 7A and 7B are successively displaced from the outer end toward the inner end of the recording area by the sled mechanism 8 to perform thermal recording of digital video and audio signals on optical disc 3. Thus, in the television camera 2, digital video signals and digital audio signals are successively recorded on optical disc 3 from the outer area, from which recorded data can be reproduced at a higher transfer rate when optical disc 3 is driven on the condition of rotation at a constant angular velocity.

The servo circuit 9 controls tracking and focusing with respect to each of the optical pickups 7A and 7B based on the tracking error signal and the focus error signal. The servo circuit 9 also drives a spindle motor 10 so that the signal level of the wobble signal changes at a predetermined frequency, thereby rotating optical disc 3 on the condition of rotation at a constant linear velocity.

Further, when optical disc 3 is loaded in the television camera 2, the servo circuit 9 drives the sled mechanism 8 under the control of a system control circuit 13 to seek the system data areas AR1 of optical disc 3 through the optical pickups 7A and 7B. Thus, in the television camera 2, various sorts of management data recorded in the system data areas AR1 can be preliminarily obtained by the system control circuit 13. On the other hand, at the time of, for example, shutting off the power supply for the television camera 2 or removing optical disc 3 out of the television camera 2, the servo circuit 9 also drives the sled mechanism 8 to seek the system data areas AR1 of optical disc 3 through the optical pickups 7A and 7B, thereby enabling additional management data to be recorded in the system data areas AR1 according to a requirement.

The camera unit 14 has an optical system for imaging an object, a solid image pickup device formed of a charge-coupled device (CCD) for forming an image of the object, and a signal processing system for processing an output signal from the CCD solid image pickup device to output digital video signal V1. With respect to this signal processing, a white balance, a gain, an audio signal level, an aperture, etc. are set as image pickup conditions by the control operation of a control circuit provided for the camera unit 14. The camera control unit 14 informs the system control circuit 13 with setting data DS consisting of these set conditions. The camera control unit 14 also informs the system control circuit 13 of time codes for digital video signal V1.

The recording signal processing circuit 11 converts digital video signal V1 output from the camera unit 14 into recording signal SR together with digital audio signals A1 and A2 in two channels and outputs the recording signal SR. Digital audio signal A1 in one channel in the signals A1 and A2 in the two channels is a stereo digital audio signal obtained from front microphones and ordinarily allotted for environmental sounds. Digital audio signal A2 in the other channel is obtained from a rear microphone and ordinarily allotted for announcer's explanatory speech, for example. Thus, in the television camera 2, digital audio signals in two channels in digital audio signals A1 to A4 in four channels recordable on optical disc 3 are recorded.

A reproduced signal processing circuit 15 processes reproduced signals RF output from the optical pickups 7A and 7B to reproduce digital video signal V1 and digital audio signals A1 and A2, and outputs these signals to a viewfinder or to an external apparatus. In the television camera 2, therefore, image pickup results can be immediately monitored if necessary. When the system data areas AR1 are accessed with the optical pickups 7A and 7B immediately after loading of optical disc 3, the reproduced signal processing circuit 15 reproduces management data recorded in the system data areas AR1 instead of digital video signal V1 and digital audio signals A1 and A2, and outputs the management data to the system control circuit 13.

The system control circuit 13 is formed of a microcomputer for controlling the recording system of the television camera 2. When optical disc 3 is loaded, the system control circuit 13 controls the operations of the servo circuit 9 and the reproduced signal processing circuit 15 to obtain management data recorded on the system data areas AR1.

Further, when a video recording button 17 is repeatedly pressed by a cameraman, the system control circuit 13 changes the operations of the recording signal processing circuit 11 and the servo circuit 9 in response to this recording button operation to record digital video signal V1 and digital audio signals A1 and A2 on optical disc 3 and to stop recording on optical disc 3. At this time, the system control circuit 13 performs seeking through the optical pickups 7A and 7B on the basis of the management data obtained from the system data areas AR1 to record digital video signal V1 and digital audio signals A1 and A2 in an area unused for recording on the optical disc 3. Also, the system control circuit 13 temporarily stores, in an internal memory, time codes for the recording start time and recording end time corresponding to the pressing operation of the video recording button 17 and corresponding addresses on the optical disc 3.

Also, the system control circuit 13 temporarily stores, in an internal memory, data which is input by operating an operating knob 19 and which consists of a time when image pickup operation is performed, a place where image pickup operation is performed, and a name of a cameraman, data input by operating a marker key 19A to enable identification as to whether each of files is an editable file, and television camera setting data DS supplied from the camera unit 14. From the data thus stored temporarily in the internal memory, the system control circuit 13 forms data for management of each file recorded on optical disc 3. The system control circuit 13 writes, through a drive circuit not shown, this management data in the system data area of the optical disc 3 in a certain situation, for example, when optical disc 3 is unloaded.

The system control circuit 13 also starts the operation of the reproduced signal processing circuit 15 when a cameraman operates, for example, an operating button for starting reproduction, thereby enabling files recorded on optical disc 3 to be monitored as desired.

Figure 4:
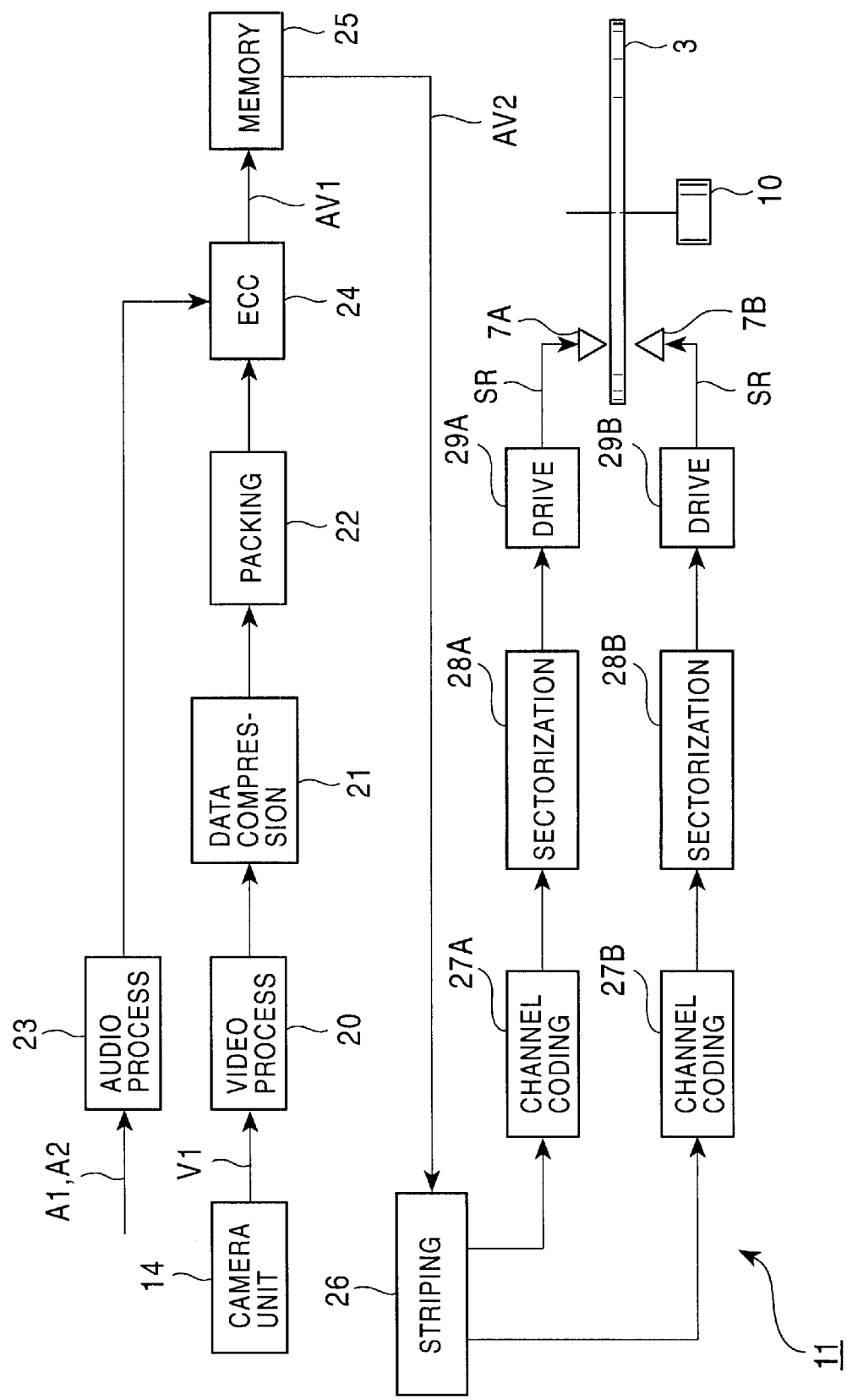
FIG. 4 is a block diagram of a recording signal processing circuit of the television camera shown in FIG. 1.

FIG. 4 is a block diagram of the recording signal processing circuit 11. In the recording signal processing circuit 11, a video process circuit 20 receives digital video signal V1 output from the camera unit 14, corrects the signal level of this digital video signal V1, removes unnecessary data such as blanking periods, and thereafter outputs the signal.

A data compression circuit 21 successively compresses data of digital video signal V1 output from the video process circuit 20 into a format prescribed by the Moving Picture Experts Group (MPEG) and outputs the compressed data. A packing circuit 22 forms blocks of data corresponding to a predetermined data unit from the image data output from the data compression circuit 21.

An audio process circuit 23 corrects the signal level of digital audio signals A1 and A2 and outputs the corrected digital audio signals A1 and A2. An error-correcting code (ECC) circuit 24 adds an error-correcting code in a product code form to the audio data output from the audio process circuit 23 and to the image data output from the packing circuit 22, and outputs the data with the error-correcting code. At this time, in the recording signal processing circuit 11, digital audio signals A1 and A2 and the image data are processed successively and alternately by transferring the signals through predetermined buffer memories. That is, referring to FIG. 5, continuous digital video signal V1 and digital audio signals A1 and A2 (FIGS. 5(A), 5(B1), and 5(B2)) are input to the recording signal processing circuit 11 to form a time-division-multiplexed output from the ECC circuit 24 (FIG. 5(C)).

A memory 25 is formed of a large-capacity buffer memory. The memory 25 temporarily stores output data AV1 from the ECC circuit 24, and outputs a data array corresponding to the recording areas described above with reference to FIG. 2. That is, the memory 25 outputs a predetermined amount of image data V1, then outputs the corresponding digital audio signal A1 in the first channel, and subsequently outputs the corresponding digital audio signal A2 in the second channel (see FIG. 5(D)). In this embodiment, digital video audio signals are recursively recorded in a cycle corresponding to ten frames by processing using the memory 25, thus forming the concentric areas described above with reference to FIG. 2.

A striping circuit 26 separates output data AV2 from the memory 25 into two sequences of data corresponding to the optical pickups 7A and 7B, and outputs these sequences of data. Channel coding circuits 27A and 27B process the two sequences of data output from the striping circuit 26 in an interleaving manner, thereafter modulate the data by a modulation method suitable for recording on optical disc 3, and output the modulated data. Sectorization circuits 28A and 28B respectively add data such as sync patterns, preambles and postambles to the groups of data output from the channel coding circuits 27A and 27B, and output the data. Drive circuits 29A and 29B respectively drive the optical pickups 7A and 7B in accordance with the groups of data output from the sectorization circuits 28A and 28B, thereby intermittently increasing the quantities of laser beam light.

In the television camera 2, digital video signal V1 and digital audio signals A1 and A2 are recorded on optical disc 3 at a transfer rate of 33 Mbps. As management data, data output from the system control circuit 13 is input to the drive circuit 29B by predetermined data processing circuit to be recorded on optical disc 3.

Figure 6:
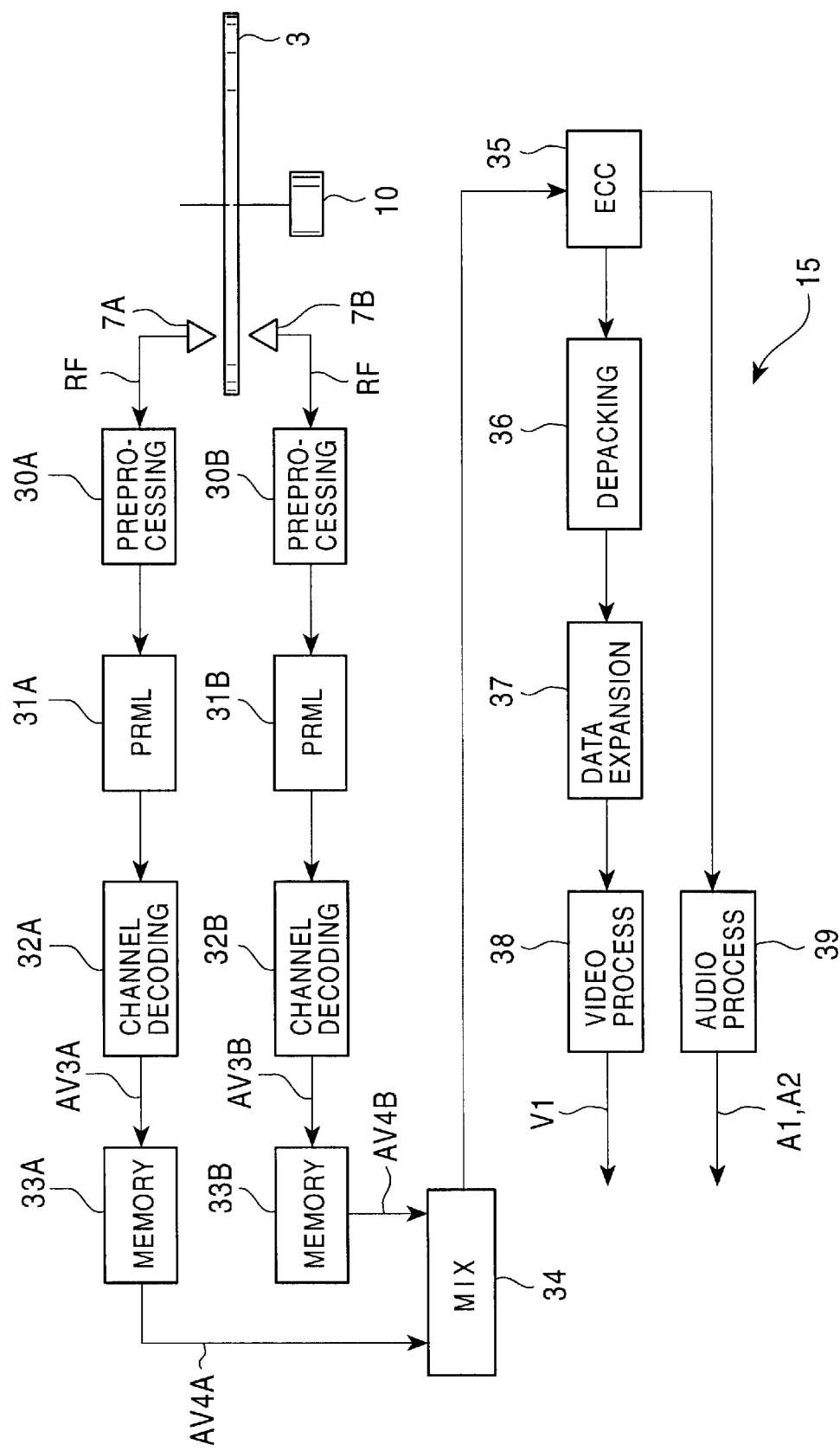
FIG. 6 is a block diagram of a reproduced signal processing circuit of the television camera shown in FIG. 3.

FIG. 6 is a block diagram of the reproduced signal processing circuit 15 of the television camera 2. In the reproduced signal processing circuit 15, preprocessing circuits 30A and 30B respectively waveform-equalize the reproduced signals RF output from the optical pickups 7A and 7B by their respective internal equalizer circuits, and thereafter binarize the equalized signals by binarization circuits. The preprocessing circuits 30A and 30B also reproduce, by their internal PLL circuits, binary signals obtained by binarization. Further, the preprocessing circuits 30A and 30B successively convert analog reproduced signals RF into digital signals based on this clock, and output the digital reproduced signals.

Partial response maximum likelihood (PRML) circuits 31A and 31B respectively waveform-equalize the digital reproduced signals output from the preprocessing circuits 30A and 30, and thereafter decode the equalized signals by maximum likelihood decoding circuits formed of, for example, Viterbi decoding circuits. Thus, digital video and audio signals recorded on optical disc 3 are decoding by using PRML techniques.

Figure 7:
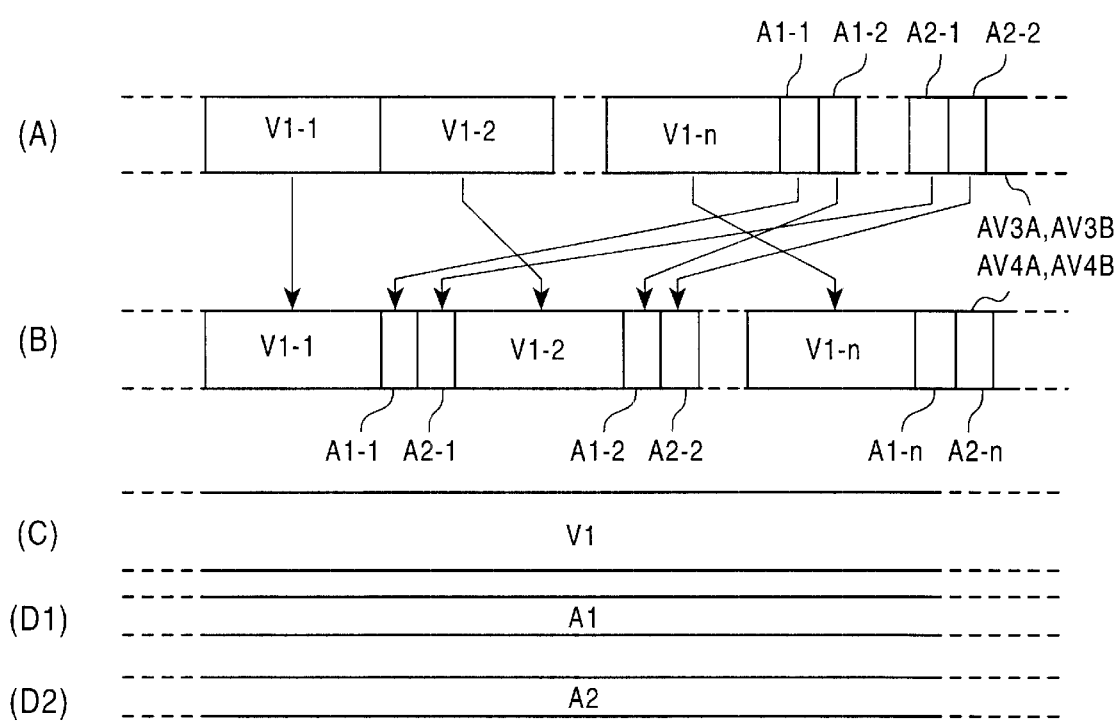
FIG. 7 is a time chart for explaining the operation of the reproduced signal processing circuit shown in FIG. 6.

Channel decoding circuits 32A and 32B process the data output from the PRML circuits 31A and 31B by deinterleaving processing and output the processed data. Memories 33A and 33B temporarily store the data output from the channel decoding circuits 32A and 32B and output the data in a predetermined order. That is, as shown in FIG. 7, reproduced data AV3A and AV3B (FIG. 7(A)) reproduced from optical disc 3 in the order corresponding to the configuration of user data area AR2 shown in FIG. 2 are temporarily stored and predetermined unit blocks of digital video signal V1 and digital audio signals A1 and A2 are sequentially output corresponding to the processing at the time of recording (FIG. 7(B)).

A mixer (MIX) 34 converts the two sequences of digital signals output from the memories 33A and 33B into one sequence of digital signals, and outputs this sequence of signals. An ECC circuit 35 receives the data output from the mixer 34, performs error-correcting processing of this data using the error-correcting code attached to the data, and outputs the error-corrected data. A depacking circuit 36 receives the video data from the ECC circuit 35 and outputs the video data in the form of the original array.

A data expansion circuit 37 expands the data output from the depacking circuit 36 and outputs the expanded data. A video process circuit 38 converts the data output from the depacking circuit 36 into digital video signal V1 in the predetermined format and outputs this signal (FIG. 7(C)). An audio process circuit 39 receives audio data from the ECC circuit 35 and outputs the audio data as digital audio signals A1 and A2 in the predetermined format (FIGS. 7(D1), 7(D2)). The television camera 2 is thus arranged to enable collected materials recorded on optical disc 3 to be confirmed in the place where materials have been collected.

Figure 8:
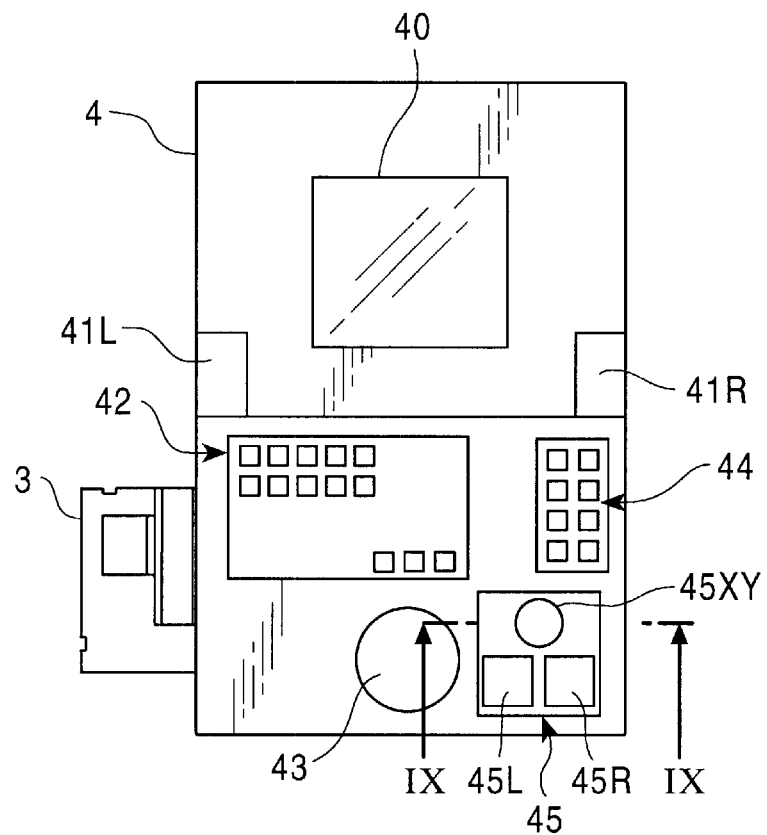
FIG. 8 is a front view of a viewer in the editing system shown in FIG. 1.

FIG. 8 is a plan view of the viewer 4. The viewer 4 is carried to a material collecting place along with personal computer 5 to edit collected materials recorded on optical disc 3. In the editing system 1, therefore, collected materials can be edited and easily and promptly in a material collecting place.

The viewer 4 has a display 40 formed of a liquid crystal display panel and provided in its front portion. An editing window is displayed on the display 40. The viewer 4 is arranged to execute editing operations through graphical user interface (GUI) formed in this window as well as to confirm the contents of collected materials and edit results. The viewer 4 also has built-in speakers 41L and 41R set in two side portions below the display 40. The speakers 41L and 41R enable confirmation of speeches formed by digital audio signals recorded on optical disc 3 and edit results.

The viewer 4 also has standard operating buttons 42 arranged below the built-in speakers 41L and 41R. The operating buttons 42 have reproducing, fast-forward and reverse-reproducing functions necessary for reproduction of digital video and audio signal recorded on optical disc 3. The viewer 4 further has a search dial 43 necessary for special reproducing operations for, for example, shuttle reproduction and jog reproduction, edit operating buttons 44 necessary for editing (including, for example, operating buttons such as MARK-IN and MARK-OUT buttons for determining necessary cut-ins and cut-outs), and a pointing device 45. The operating buttons 42 and 44 are formed of buttons which are operated by being pressed. The search dial 43 is formed of a rotary knob in a rotary encoder arrangement. The pointing device 45 has pressed buttons 45R and 45L corresponding to left and right mouse clicking buttons, and an operating knob45XY constituting XY coordinate input means.

Figure 9:
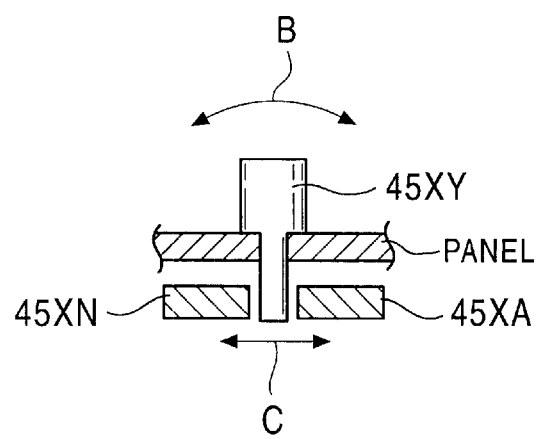
FIG. 9 is a cross-sectional view of a pointing device in the viewer shown in FIG. 8.

As shown in FIG. 9 which is a cross-section taken along the line IX—IX of FIG. 8, the operating knob 45XY is formed so as to have a lower extension passing through the panel, and pressing force detection means, e.g., strain gauges 45XA, 45XN . . . are disposed close to the lower end of the operating knob 45XY in X and Y directions therefrom. When the operating knob 45XY is inclined relative to the panel as indicated by arrow B in FIG. 9, the lower end presses the pressing force detection means as indicated by arrow C, thus making it possible to detect a pressing force.

Figure 10:
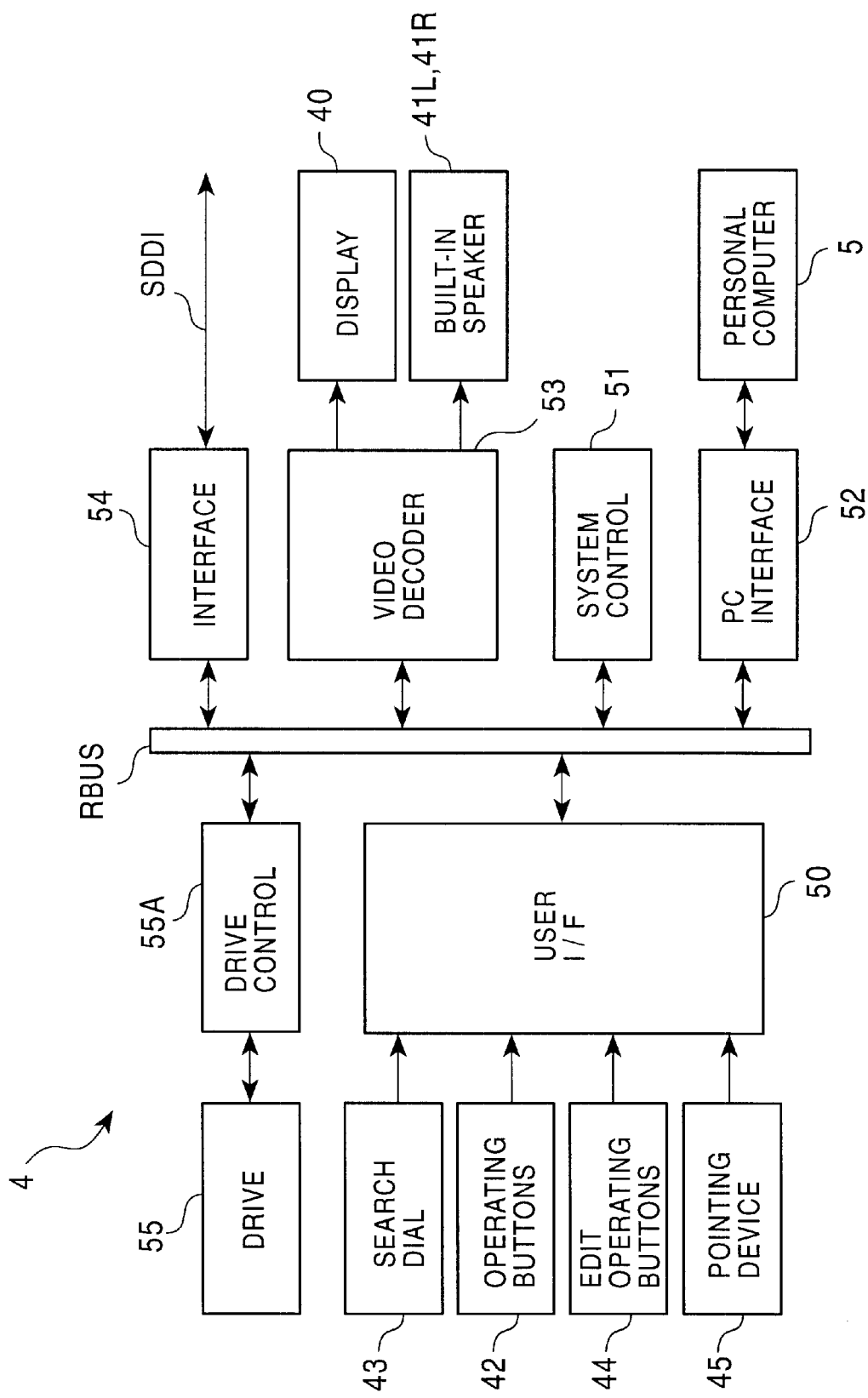
FIG. 10 is a block diagram showing the configuration of the viewer shown in FIG. 8.

FIG. 10 is a block diagram showing the entire configuration of the viewer 4. The viewer 4 is connected to the personal computer 5 through, for example, the small computer system interface (SCSI), Ether, IEEE (The Institute of Electrical and Electronics Engineers, Inc.) 1394 or the like.

The viewer 4 reproduces data from optical disc 3 in response to an operation of, for example, operating buttons 42 or by being controlled through the personal computer 5, and records, in system data area AR1, an edit list formed in the personal computer 5.

That is, a user interface (user I/F) 50 detects operations of the search dial 43, the standard operating buttons 42, the edit operating buttons 44 and the pointing device 45, and informs a system control 51 of detected operations via a local bus RBUS.

A personal computer (PC) interface 52 is connected to the local bus RBUS to perform interfacing with the personal computer 5. The PC interface 52 supplies the personal computer 5 with various status data output from the system control 51, still images formed by a video decoder 53, and digital video and audio signals, and informs the system control 51 of various control commands and an edit list output from the personal computer 5.

The operation of the video decoder 53 is changed by control performed by the system control 51. The video decoder 53 is supplied with reproduced data output from a drive control 55A via the local bus RBUS, and demodulates this reproduced data to obtain demodulated digital video and audio signals, displays the demodulated digital video signal on the display 40 and outputs the digital audio signals through built-in speakers 41L and 41R. The video decoder 53 also outputs the demodulated video and audio signals to the personal computer 5 via the PC interface 52.

At this time, the video decoder 53 is intermittently supplied with reproduced data from a drive control 55A, stores the supplied reproduced data in its internal memories, successively processes the reproduced data stored in the memories to obtain sequences of demodulated digital video and audio signals.

The video decoder 53 forms one frame of image data designated by the system control 51 from the reproduced digital video signal, and outputs this image data to the PC interface 52 via the local bus RBUS. The viewer 4 thereby outputs a still image at an in point, out point or the like to the personal computer 5. Also, the digital video and audio signals reproduced under the control of the system control 51 are output to an interface 54.

The interface 54 is arranged so as to be capable of being mounted in the viewer 4 according to need. The interface 54 converts the digital video and audio signals input via the local bus RBUS into serial data SDDI in a predetermined format, and outputs the data SDDI to an external apparatus. Thus, the viewer 4 is arranged to enable editing results and collected materials to be recorded by a video tape recorder or the like if necessary.

A drive 55 and the drive control 55A reproduce data from the optical disc under the control of the system control 51 and output the reproduced data. This reproduced data corresponds to the data output from the channel decoding circuits 32A and 32B of the reproducing system described above with reference to FIG. 6.

The system control 51 is formed of a microcomputer for controlling the operation of the viewer 4. When some of the standard operating buttons 42 is operated through the user interface 50, the system control 51 changes the operations of the drive 55, the drive control 55A and the video decoder 53 in response to the operation of the operating button 42, thereby enabling digital video and audio signals recorded on optical disc 3 to be monitored. At this time, the system control 51 selectively reproduces the digital and audio signals needed by an operator. Thus, reproduction of a file judged to be inappropriate to the intention of editing by, for example, a cameraman is canceled, so that the editing efficiency is improved.

If the search dial 43 is operated during reproduction from optical disc 3, the system control 51 controllably changes the reproducing speed by an amount corresponding to the operation of the search dial 43, and displays the results of reproduction of digital video and audio signals frame by frame. If the edit operating buttons 44 are operated while a predetermined scene is being displayed after being selected by the operator in this manner, the system control 51 sets an in point, out point or the like in response to this operation. Further, the system control 51 instructs the video decoder 53 to transfer the image data of the frame corresponding to the set in or out point to the personal computer 5.

The system control 51 also sets an in and out point in the same manner with respect to audio signals recorded on optical disc 3, and instructs the video decoder 53 to transfer to the personal computer 5 the digital audio signals selected by the operator in a predetermined range in the vicinity of the in or out point.

Further, the system control 51 informs the personal computer 5 of time codes for in and out points or the like set in the above-described manner. The system control 51 also controls the drive 55 and the drive control 55A in accordance with a control command output from the personal computer 5 to enable monitoring of editing results in accordance with an edit list EDL made by the personal computer 5.

In this control of the drive 55 and drive control 55A, the system control 51, when informed of loading of optical disc 3 from the drive control 55A, instructs the drive control 55A to perform reproduction from the system data areas AR1, and obtains and holds management data recorded in the system data areas AR1. The system control 51 informs the personal computer 5 of a common serial number for a group of optical discs 3 including the above-described optical disc 3, and individual identification data assigned to the above-described optical disc 3, from the obtained management data, thereby enabling the personal computer 5 to use this identification number as a so-called roll number.

When optical disc 3 is accessed by the operation of some of the standard operating buttons 42, edit operating buttons 44 and search dial 43, the system control 51 selectively accesses, based on data for management of files obtained in the above-described manner, the file that the operator intends to access, thus improving the editing efficiency. This will be done in a situation where optical disc 3 is accessed by excluding files judged to be unusable for editing according to identification data set by a cameraman or in a like situation.

The system control 51 also informs the personal computer 5 of data for management of each file recorded on optical disk 3, names of files in which an in or out point is set, and time codes for in and out points, thereby enabling the personal computer 5 to make an edit list by using these kinds of data. Data of an optimum light quantity reproduced from the system data areas is used for control of the amount of laser beam light in the drive 55.

The viewer 4 is arranged to enable annexation of other sets of drive 55 and drive control 55A according to need. If another set of drive 55 and drive control 55A is annexed, the system control 51 also performs the same processing with respect to the annexed drive 55 and drive control 55A.

When a preview operating button in edit operating buttons 44 is operated, the system control 51 informs the personal computer 5 of this operation and controls the drive 55 and drive control 55A in accordance with an edit list sent from the personal computer 5 in response to this information. The system control 51 thereby enables confirmation of previewing results using the display 40 and the built-in speakers 41L and 41R, and also enables confirmation on the personal computer 5 side.

When the pointing device 45 is operated, the system control 51 informs the personal computer 5 of data of this operation. The system control 51 thereby enables editing through the GUI to be performed on the personal computer 5 side by the operation of the pointing device 45.

When editing is completed, the system control 51 obtains edit list EDL from the personal computer 5, controls the operation of the drive 55 and drive control 55A to record this edit list EDL in the system data area of optical disc 3. The system control 51 also monitors the operation of the drive control 55A and other sections to inform the personal computer 5 of various statuses if necessary.

Figure 11:
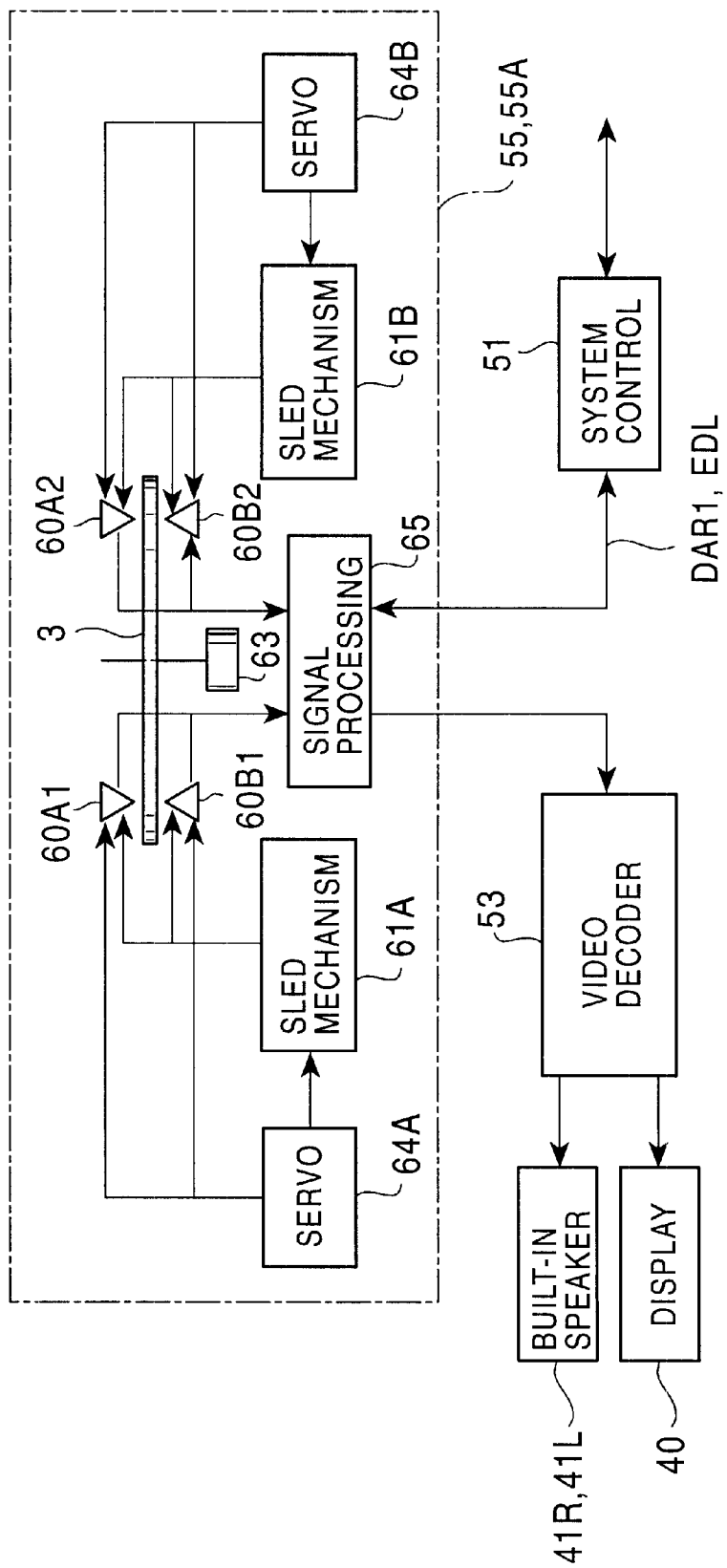
FIG. 11 is a block diagram showing details of the configuration of a drive and a drive control in the viewer shown in FIG. 10.

FIG. 11 is a block diagram of showing the drive 55 and the drive control 55A together with essential peripheral components. In the viewer 4, the drive 55 has two pairs of optical pickups 60A1 and 60B1, and 60A2 and 60B2 supported so as to face the two surfaces of optical disc 3.

The pairs of optical pickups 60A1 and 60B1, and 60A2 and 60B2 are respectively supported by sled mechanisms 61A and 61B so as to be movable in radial directions of optical disc 3 in such a state that each pair of optical pickups face each other with optical disc 3 interposed therebetween. In the operation of the drive 55, one pair of optical pickups 60A1 and 60B1 are assigned to reproduction of digital video signals while the other pair of optical pickups 60A2 and 60B2 are assigned to reproduction of digital audio signals, thereby making it possible to reproduce digital video and audio signals recorded in divided areas while sufficiently reducing waiting times. Also, the arrangement is such that digital video and audio signals recorded in different places and different times can be simultaneously reproduced in parallel with each other.

In the drive 55, a spindle motor 63 drives optical disc 3 on the condition of rotation at a constant angular velocity under the control of a spindle servo circuit (not shown). The rotating speed of optical disc 3 is set to a speed higher than the rotating speed when the system data areas AR1 are accessed while optical disc 3 is being driven on the condition of rotation at a constant linear velocity. More specifically, the rotating speed is set so that digital video and audio signals can be reproduced with a data transfer rate of 50 Mbps at the inner end of the user area and with a data transfer rate of 120 Mbps at the outer end. Thus, with respect to optical disc 3 on which digital video and audio signals are successively recorded from the outer end in the television camera 2, the drive 55 is arranged to reproduce digital video and audio signals by setting a higher data transfer rate at a position in or closer to the outermost area preferentially used for recording. When an edit list is recorded in the system data area, the spindle motor 63 rotates the optical disc 3 on the condition of rotation at a constant linear velocity prescribed with respect to optical disc 3.

Servo circuits 64A and 64B perform tracking control and focusing control of the optical pickups 60A1, 60B1, 60A2, and 60B2 and control the sled movements of the optical pickups 60A1, 60B1, 60A2, and 60B2 through the sled mechanisms 61A and 61B.

A signal processing circuit 65 processes reproduced signals output from the optical pickups 60A1, 60B1, 60A2, and 60B2, outputs reproduced data corresponding to digital video and audio signals to the video decoder 53, and outputs reproduced data DAR1 from the system data areas AR1 to the system control 51. The signal processing circuit 65 also drives the optical pickup 60B2 in accordance with edit list EDL output from the system control 51 to record edit list EDL in the system data area AR1 of optical disc 3.

Data recorded on optical disc 3 by rotating optical disc 3 so that the data transfer rate is higher when the reproducing position is closer to the outer end can be reproduced in such a manner that, under the control of the drive control 55A, the servo circuits 64A and 64B cause the optical pickups 60A1, 60B1, 60A2, and 60B2 to jump tracks toward the outer end by predetermined timing according to the amount of reproduced data held by the video decoder 53, thus performing intermittent reproduction from optical disc 3. The signal processing circuit 65 intermittently processes reproduced signals output from the optical pickups 60A1, 60B1, 60A2, and 60B2 in a linked relationship with the control of the optical pickups 60A1, 60B1, 60A2, and 60B2 with the servo circuits 64A and 64B.

Thus, in the viewer 4, digital video and audio signals can be continuously reproduced while optical disc 3 is being driven on the condition of rotation at a constant angular velocity. Also, a waiting time which occurs during intermittent reproduction of digital video and audio signals can be efficiently utilized as a seek time, so that, even when files recorded on optical disc 3 are discretely accessed in accordance with an edit list, digital video and audio signals can be reproduced substantially continuously. Thus, in this editing system 1, digital video and audio signals can be processed by being recorded on and reproduced from one optical disk from the image pickup apparatus to the editing process.

Figure 12:
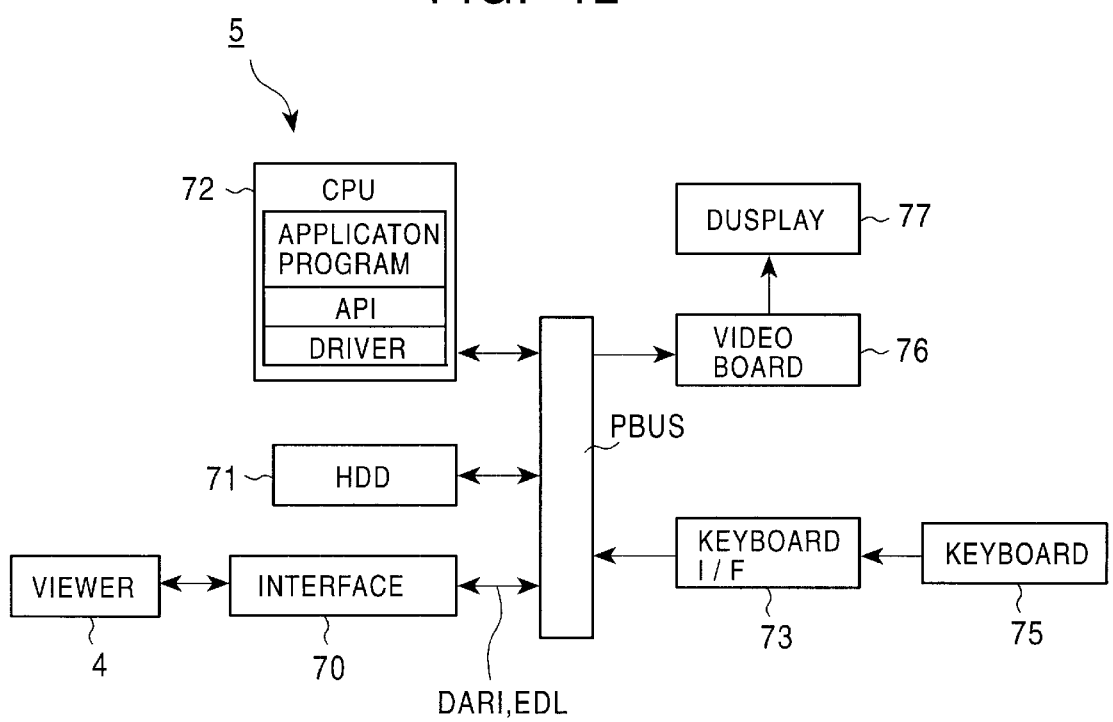
FIG. 12 is a block diagram of a personal computer in the system shown in FIG. 1.

FIG. 12 is a block diagram of the personal computer 5. In the personal computer 5, an interface 70 is supplied with management data DRA1, time codes for in and out points and image data of a still image from the viewer 4, and outputs these kinds of data to a PCI bus PBUS. The interface 70 supplies the viewer 4 with various control commands or the like supplied via the PCI bus PBUS.

A hard disk drive (HDD) 71 has an operating system necessary for operating the personal computer 5, an application program and the like recorded therein. The hard disk drive 71 also stores management data, still image data and time codes transferred from the viewer 4 and outputs these groups of data to a central processing unit (CPU) 72 as desired. The hard disk drive 71 further stores edit list EDL formed by the central processing unit 72 and outputs this edit list EDL to the viewer 4 via the interface 70.

A keyboard interface 73 detects an operation of a keyboard 75 and outputs a detection result to the PCI bus PBUS. A video board 76 operates under the control of the central processing unit 72 to display on a display 77 a predetermined menu window with still images transmitted from the viewer 4 as well as to display preview images.

The central processing unit 72 starts a predetermined operating system when the viewer 4 and the personal computer 5 are started to operate, and incorporates various drivers including one for driving the viewer 4. The central processing unit 72 also starts an application program for editing subsequent to the operating system, changes the window on the display 77 in accordance with the application program, and issues commands to the viewer 4 if necessary. The central processing unit 72 makes edit list EDL in the hard disk drive 71 by editing. When editing is finished, the central processing unit 72 issues control commands to the hard disk drive 71 and the viewer 4 to transfer this edit list EDL to the viewer 4 and to record edit list EDL on optical disc 3.

In this process, the central processing unit 72 enables, through an application programming interface (API), a predetermined cursor (pointer) on the display 77 to be moved in accordance with pointing device 45 operating date supplied from the viewer 4, and enables one of various menu items to be selected by the cursor operation.

Figure 13:
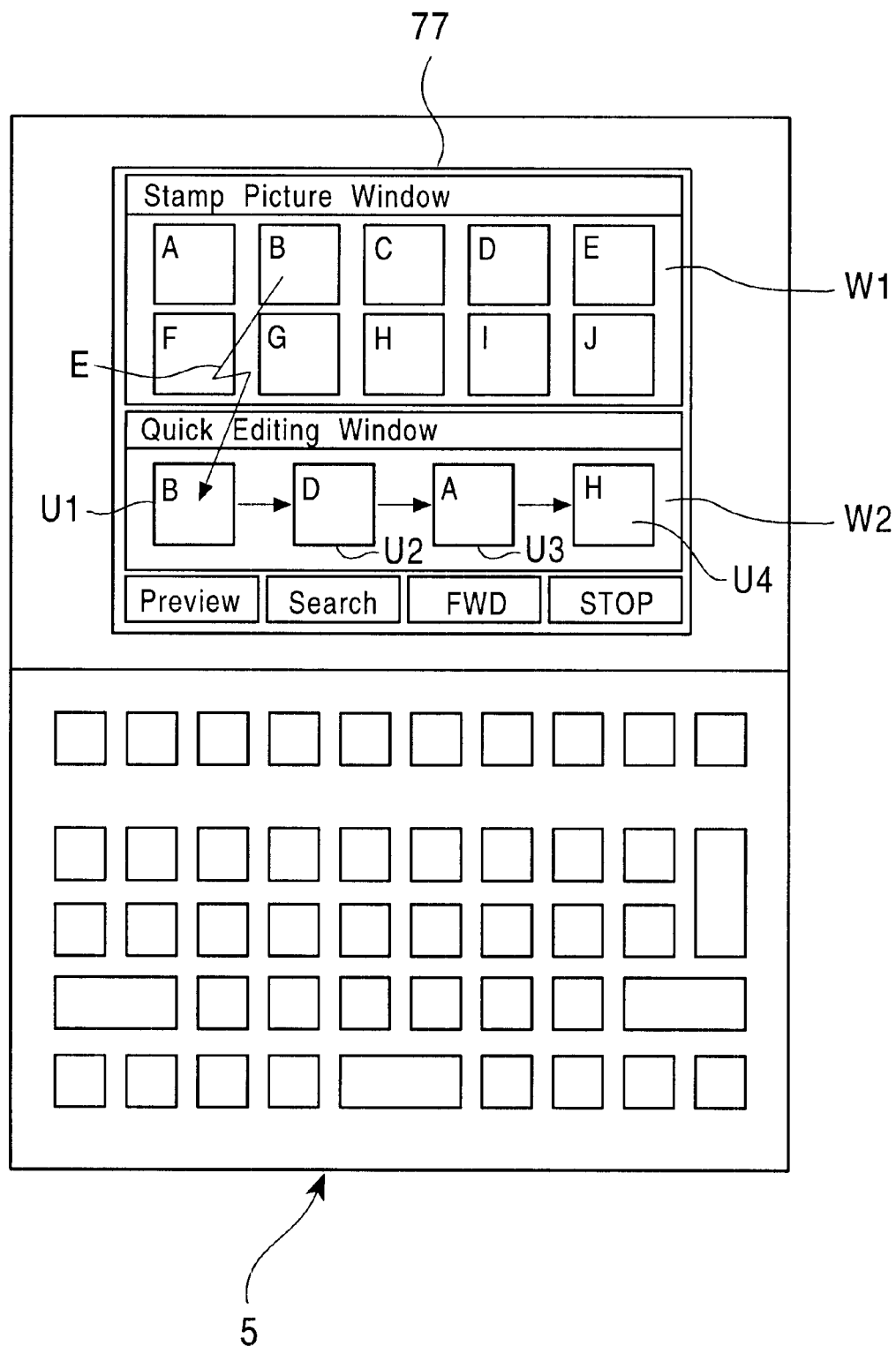
FIG. 13 is a plan view of the personal computer of the editing system shown in FIG. 1, showing displayed windows.

FIG. 13 is a plan view of the personal computer 5 showing an editing window displayed on the display 77 of the personal computer 5. The central processing unit 72 displays a predetermined menu window when an application program used for editing is started. If an operator selects, in the menu window, simple editing using stamp pictures by operating the pointing device 45 in the viewer 4, the central processing unit 72 forms a window such as shown in FIG. 13 by executing processing for an event registered in connection with the menu item for simple editing. Further, the central processing unit 72 executes a sequence of editing operations by executing processing for events registered in connection with sub-windows forming the displayed window.

In a case where an editing menu item other than simple editing using stamp pictures is selected, the central processing unit 72 also displays, in a predetermined window, necessary management data and other data sent from the viewer 4, and forms an edit list in response to operator's selecting operation based on this display.

If a menu item for selecting pictures is selected, the central processing unit 72 displays a predetermined window and issues various commands to optical disk 3 in response to operator's operations through the displayed widow, thereby enabling collected materials to be also confirmed by operations through the GUI displayed on the computer 5 side. The central processing unit 72 accepts setting of in and out points similar to setting of in and out points in the viewer 4 described above with reference to FIG. 10, thereby enabling editing-object files to be also selected previously by operations through the GUI displayed on the personal computer 5 side and by using data for management of each file recorded on optical disc 3.

In simple editing using stamp pictures, the central processing unit 72 displays in-point still images selected in the viewer, the still images being arrayed in a stamp picture display sub-window W1 formed in an upper portion of the editing window. The central processing unit 72 also displays a simple editing sub-window W2 below the stamp picture display sub-window W1. The central processing unit 72 forms, in the sub-window W2, display frames U1 to U4 in which some of the still images displayed in the stamp picture display sub-window W1 are arranged. When some of the still images displayed in the stamp picture display sub-window W1 are dragged and dropped into the display frames U1 to U4, the central processing unit 72 places the corresponding still images one by one in the display frames U1 to U4. The central processing unit 72 makes edit list EDL such that the corresponding cuts selected in the viewer 4 are successively reproduced in the order of arrangement in this simple editing sub-window W2.

The central processing unit 72 also arranges menu items for previewing, search, forward reproduction and stop below the simple editing sub-window W2. When one of these menu items is clicked with the pointing device 45, the central processing unit 72 executes processing for an event registered in connection with the menu item and controls the overall operation.

That is, when the menu item for previewing is clicked, the central processing unit 72 issues reproducing commands to the viewer 4 in accordance with edit list EDL stored in the hard disk drive 71 to previewing.

When the menu item for searching is clicked, the central processing unit 72 instructs the viewer 4 to perform, based on management data recorded in the hard disk drive 71, fast-forward reproduction of files with which identification data has been set by a camera man (excluding those judged to be inappropriate to the intention of editing). If some of still images displayed in the stamp picture display window W1 are selected by the operator, the central processing unit 72 instructs the viewer 4 to perform fast-forward reproduction with respect to the selected still images.

When the menu item for forward reproduction is clicked, the central processing unit 72 instructs the viewer 4 to perform forward normal reproduction with respect files recorded on optical disc 3 or files selected by the operator.

When the menu item for stop is clicked, the central processing unit 72 outputs a reproducing stop instruction to the viewer 4.

If a menu item for editing audio signals is selected in the initial window, the central processing unit 72 displays a GUI window similar to that for editing images, and makes an audio signal edit list.

If another edit menu is selected, the central processing unit 72 displays the roll number provided as an optical disc 3 identification number and data for management of files. This display also enables formation of an edit list by selecting some of the files and by setting in and out points or the like. Thus, the personal computer 5 can execute editing by referring to image pickup information added to each file.

(1-2) Operation of First Embodiment

In the television camera 2 in the editing system 1 arranged as described above (see FIG. 1), digital video signals and digital audio signals representing collected materials are recorded on optical disc 3. This optical disc 3 is loaded in the viewer 4 to reproduce data therefrom. An edit list made on the basis of the collected materials is also recorded on the optical disc 3.

This procedure enables collected materials and an edit list made by editing the collected materials to be managed on one base, i.e., one recording medium. Optical disc 3 used as such recording medium to record materials collected in a material collecting place is brought back from the material collecting place to a broadcasting station and the collected materials can be readily broadcast by being successively reproduced in accordance with an edit list. Editing of the materials can be executed by selecting desired cuts after only loading optical disc 3 in viewer 4. Therefore, the time required for editing can be markedly reduced in comparison with the conventional art. Moreover, there is no need for operations for rerecording on a recording medium such as a magnetic tape after editing.

Further, in the optical disc, identification data for confirmation as to whether collected materials are appropriate to the intention of editing is recorded as management data. At the time of editing, recorded digital video and audio signals are selectively reproduced based on such management data, thus improving the efficiency of editing.

That is, in the television camera (see FIG. 4), digital video signal V1 output from the camera unit 14 is preprocessed by the video process circuit 20, thereafter compressed by the data compression circuit 21, and formed into blocks by the subsequent packing circuit 22. In the subsequent ECC circuit 24, an error correcting code is added to the digital video signal. Thereafter, the signal is processed through the memory 25 and converted into two sequences of data by the striping circuit 26. These two sequence of data are modulated by the channel coding circuit 27A and 27B and supplied to the sectorization circuits 28A and 28B and to the drive circuits 29A and 29B to be recorded on optical disc 3 on the condition of rotation at a constant linear velocity.

In this recording, the digital video and audio signals (see FIG. 3) are simultaneously recorded on two surfaces of optical disc 3 driven on the condition of rotation at a constant linear velocity from the pair of optical pickups 7A and 7B disposed on the opposite sides of optical disc 3. The signals are recorded from the outer end of optical disc 3, in which pre-grooves are formed from the outer end to the inner end of the recording surfaces so as to wind in opposite directions as viewed from the opposite sides of optical disc 3. Thus, on optical disc 3, digital video signals and digital audio signals are successively recorded from the outer area, from which data can be reproduced at a higher transfer rate when optical disc 3 is driven on the condition of rotation at a constant angular velocity.

Figure 5:
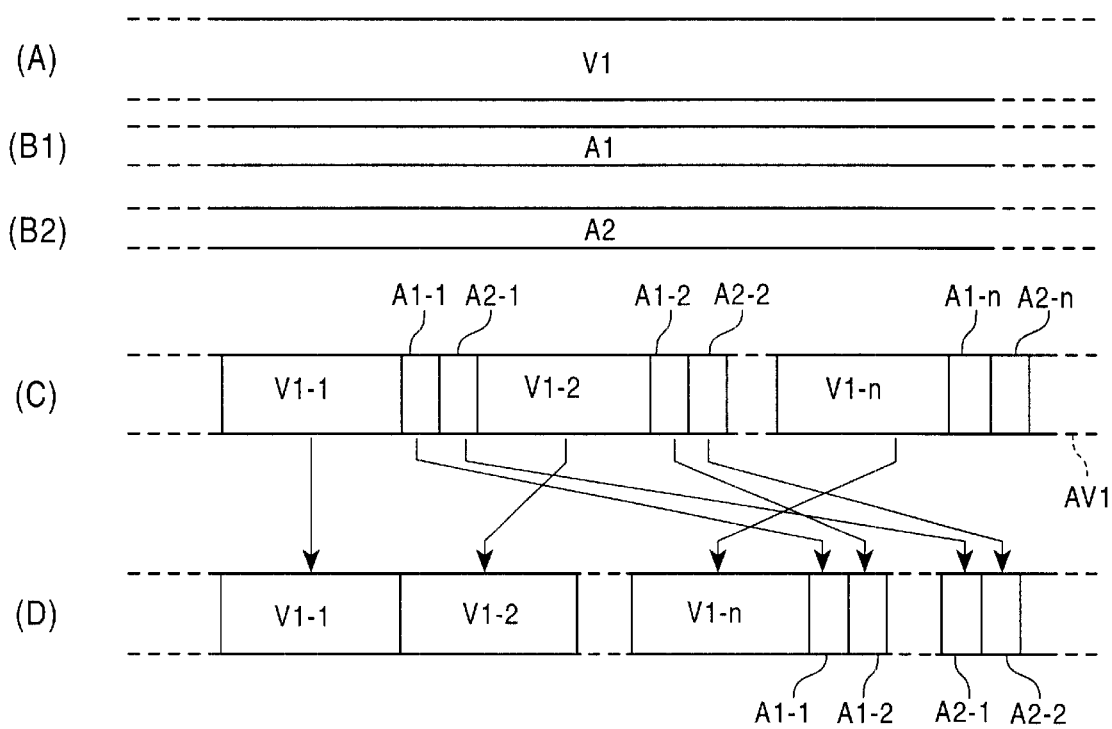
FIG. 5 is a time chart for explaining the operation of the recording signal processing shown in FIG. 4.

By the inputting and outputting operation of the memory 25, digital video signal V1 is recorded from the outer end of optical disc 3 for a predetermined time period, and corresponding digital audio signals, i.e., first-channel digital audio signal A1, second-channel digital audio signal A2, third-channel digital audio signal A3, and fourth-channel digital audio signal A4, are thereafter recorded, followed by recursive recording of digital video signal V1 and digital audio signals A1 to A4 (see FIGS. 2 and 5).

When recording on optical disc 3 is completed (see FIG. 3), times codes for recording start times and recording end times, addresses on optical disc 3, image pickup time/place data, a name of a cameraman, data for identification as to whether each of files recorded on optical disc 3 is an editable file are recorded with respect to the files on the second area AR1B in the system data area AR1 allotted at the inner end of the recording area on optical disc 3 (see FIG. 2), along with setting data DS supplied from the camera unit 14.

The digital video and audio signals thus recorded on optical disc 3 are reproduced to obtain reproduced signals RF from the optical pickups 7A and 7B. In the television camera 2 (see FIGS. 2, 6 and 7), the reproduced signals RF are respectively corrected in the preprocessing circuits 30A and 30B, thereafter decoded by processing in the PRML circuits 31A and 31B and the channel decoding circuits 32A and 32B, and input to the memories 33A and 33B. By the inputting and outputting operations of the memories 33A and 33B, the digital video and audio signals successively input recursively in the order of digital video signal V1 and digital audio signals A1 to A4 corresponding to the assignment in the information recording surfaces described above with reference to FIG. 2 are changed into sequences of predetermined unit blocks. The signals are then combined into one sequence of data in the subsequent mixer 34.

Further, after undergoing error-correcting processing in the subsequent ECC circuit 35, the digital audio signals are demodulated by the audio process circuit 39 to be output while the digital video signal is processed by the depacking circuit 36 to have the original array form, expanded by the data expansion circuit and demodulated by the video process circuit 38 to be output. The collected materials recorded on optical disc 3 are reproduced in this manner in the television camera 2 to be confirmed if necessary.

When collection of materials with the television camera 2 in a material collecting place performed as described above is finished, the optical disc 3 having collected materials recorded therein is loaded in the viewer 4, and editing operations are performed with the viewer 4 and the personal computer 5 (see FIG. 8). When the power supply for each of the viewer 4 and the personal computer 5 is turned on, a predetermined operating system is started in the personal computer 5 and an application program for editing is started after the operating system (see FIG. 12). Further, a predetermined menu window is displayed on the display 77 of the personal computer 5 by the application program.

When the optical disc 3 is loaded in the viewer 4 while the application program is in the activated state or while only the power supply for the viewer 4 is on, or when the power supply for the viewer 4 is turned on after loading the optical disc 3 in the viewer 4, file management data recorded in the system data areas AR1 is reproduced with two optical pickups 60A1 and 60A2 in the two pairs of optical pickups 60A1 and 60B1, and 60A2 and 60B2 supported so as to face each other with optical disc 3 interposed therebetween. This management data is held by the system control 51 and is output to the personal computer 5 to be recorded by the hard disk drive 71 (FIG. 12) of the personal computer 5.

When some of the standard operating buttons 42 arranged on the viewer 4 is operated (FIG. 11), the areas assigned to the digital video signal are accessed with one pair of optical pickups 60A1 and 60B2 in response to this operation, and the areas assigned to the digital audio signals are accessed with the other pair of optical pickups 60A2 and 60B2. Reproduced signals RF output from the optical pickups 60A1, 60B1, 60A2, and 60B2 are processed by the signal processing circuit 65. Reproduced data thereby obtained is processed by the video decoder 54 to reproduce the digital video and audio signals. These reproduced digital video and audio signals are output through the display 40 and the built-in speakers 41L and 41R, thus enabling the materials collected by the television camera 2 to be confirmed through the viewer 4.

Data on the operation of the pointing device 45 in the viewer 4 is also supplied to the personal computer 5, and a cursor is displayed on the display 77 in response to this operation data. When a predetermined menu item is selected by the operation using the cursor, a window for confirming the contents of recording on optical disc 3 is displayed on the display 77. Further, in response to operations in this window using the pointing device 45, the central processing unit 72 of the personal computer 5 issues various control commands to the viewer 4. Reproduction from optical disc 3 is performed in accordance with these control commands, as is that in the case where standard operating buttons 44 are operated, thus enabling the collected materials to be also confirmed by operations through the GUI on the personal computer 5 side.

In this event, files judged to be editable by the cameraman are selectively reproduced by the system control 51 of the viewer 4 and the central processing unit 72 of the personal computer 5 on the basis of the file management data recorded in the system data area of the optical disc 3, thus enabling the collected materials to be confirmed easily and reliably without monitoring unnecessary materials.

In the viewer 4, the pair of optical pickups 60A1 and 60B1 in the two pairs of optical pickups 60A1 and 60B1, and 60A2 and 60B2 are used to reproduce digital video signals while the other pair of optical pickups 60A2 and 60B2 are used to reproduced digital audio signals, thereby enabling the desired digital video signals and the corresponding digital audio signals to be reproduced with an extremely small waiting time from optical disc 3 on which digital video and audio signals are successively recorded in concentric divided areas of the information recording surfaces.

When an operator operates the edit operating buttons 44 arranged on the viewer 4 while confirming the collected materials recorded on optical disc 3 in the above-described manner (FIG. 11), in and out points are set by this operation to select cuts as objects of editing. Editing-object cuts are also selected by selecting a predetermined menu on the personal computer 5 side and by operating the pointing device 45 in the window displayed by this menu selection. With respect to the digital audio signals, editing-object cuts are also selected in the same manner by operating the viewer 4 or by operating the personal computer 5.

In the case where cuts are selected with respect to the digital video and audio signals by operating the personal computer 5, the data for management of files may be displayed according to need. The data for management of files may be effectively utilized by, for example, fixing a material collecting place, a time and so on to improve the efficiency of editing.

If, for example, simple editing using stamp pictures is selected on the display 77 of the personal computer 5 (see FIG. 13) after editing-object cuts have been selected in the above-described manner, still images corresponding to the cuts previously selected are displayed on the predetermined window W1, and the still images are selectively dragged and dropped (as indicated by arrow E) by operating the pointing device 45 provided in the viewer 4, thereby arranging the cuts in the order according to the operator's intention. Also with respect to the digital audio signals, cuts previously selected are arranged in the order according to the operator's intention. Further, an edit list is made by these arrangements to be stored in the hard disk drive 71.

If in this state the operator selects the menu item for previewing, the personal computer 5 issues control commands to the viewer 4 in the reproducing order in accordance with the edit list to reproduce data from optical disc 3 in the edit order, thereby enabling the editing results to be confirmed through the displays 44 and 77 and the built-in speakers 41L and 41R.

In this reproduction from optical disc 3 in the viewer 4, optical disc 3 is driven on the condition of rotation at a constant angular velocity higher than the rotating speed at the time of accessing the system data areas AR1 on the condition of rotation at a constant linear velocity. The digital video and audio signals are thereby reproduced intermittently, and the digital video and audio signals intermittently reproduced are output as continuous digital signals from the buffer memories.

Accordingly, a waiting time which occurs during the intermittent reproduction of digital video and audio signals can be assigned as a time for seek with the optical pickups 60A1, 60B1, 60A2, and 60B2, so that images and sounds between cuts discretely selected on optical disc 3 can be continuously reproduced. Also, because of drive on the condition of rotation at a constant angular velocity, the need for the time for changing the rotating speed can be eliminated. Also for this reason, images and sounds between cuts discretely selected on optical disc 3 can be continuously reproduced.

Moreover, the pairs of optical pickups 60A1 and 60B1, and 60A2 and 60B2 are assigned to reproduction of digital video signals and reproduction of digital audio signals, respectively, thereby ensuring that, even in a case where digital video signals and digital audio signals of different files are combined, the desired editing results can be obtained by, for example, reproducing the files in outer areas with the optical pickups 60A1 and 60B1 for digital video signals while reproducing the files in inner areas with the optical pickups 60A2 and 60B2 for digital audio signals.

Further, since in optical disc 3 the recording area is divided to record digital video signals and digital audio signals separately from each other, the optical pickups 60A1, 60B1, 60A2, and 60B2 used as described above can reproduce digital video and audio signals more efficiently in comparison with the case where digital video and audio signals are recorded by being time-division-multiplexed (that is, for example, video and audio data compressed in formats prescribed by MPEG are recorded in the same time series.

That is, reproduced signals RF output from the digital video signal optical pickups 60A1 and 60B1 are processed to reproduce only digital video signals, and reproduced signals RF output from the digital audio signal optical pickups 60A2 and 60B2 are processed to reproduce only digital audio signals. Therefore, the reproducing system of the viewer 4 does not require selective processing of reproduced signals such as that required in the case where time division multiplexing is performed, so that a simpler process may suffice for reproduction of digital video and audio signals.

In case where a digital video signal is reproduced at rate of 33 Mbps from an optical disc on which a digital video signal of 30 Mbps and digital audio signal of 3 Mbps are recorded, the actual effective data rate is 30 Mbps/33 Mbps, that is, the recording reproducing capacity is apparently reduced to about 91%. In this case, with respect to the digital audio signal, the recording reproducing capacity is reduced to about 9%. In contrast, if the system for reproducing a digital video signal and the system for reproducing a digital audio signal are formed independent of each other like those in this embodiment of the present invention, and if digital video and audio signals are recorded in separate recording areas, a reduction in recording reproducing capacity can be effectively avoided.

On the other hand, in the television camera 2, digital video signals and digital audio signals are successively recorded from the outer area, from which recorded data can be reproduced at a higher transfer rate when optical disc 3 is driven on the condition of rotation at a constant angular velocity. Therefore, even if seeking with the optical pickups is performed, a sufficient spare time can be maintained to enable digital audio signals and digital video signals to be continuously reproduced.

That is, a magnetic tape of a video recording time of about twenty minutes is generally used for use in television cameras for collecting materials. In particular, in news gathering places or the like, it is rarely that recording area of this kind of recording medium is entirely used for recording of collected materials; in most cases, many areas are left unused for recording. For this reason, it is thought that, even in the case of recording collected materials on optical disc 3, the possibility of finishing collection of materials while leaving unused recording areas on optical disc 3 is strong.

In such a situation, the method of successively recording digital video and audio signals from the outer end of the recording area from which data recorded at a higher transfer rate can be reproduced ensures that a sufficient time margin can be spared to enable digital video and audio signals to be reproduced with substantially no discontinuity even if seeking is frequently repeated, in contrast with the case where digital video and audio signals are recorded from the inner end.

If the operator changes in and out points or the like of cuts after confirming editing results by previewing in the above-described manner, the operations of the viewer 4 and the personal computer 5 are such that files the operator wants to use are reproduced in response to the operation of the operating buttons or the like, changes of in and out points are accepted, and previewing processing is executed. When a final edit list is thereby determined, a file name is added to the edit list stored in the hard disk drive 71, and the edit list is transferred to the viewer 4 to be recorded in the system data area of optical disc 3 with change of the drive condition to the condition of rotation at a constant linear velocity.

This optical disc 3 is removed from the viewer 4 in the material collecting place to be brought back to the broadcasting station. In the broadcasting station, the collected materials recorded on optical disc 3 can be broadcast by being reproduced in accordance with the edit list recorded on optical disc 3 in the same manner as in previewing in the viewer 4. Alternatively, the results of reproduction from optical disc 3 in accordance with the edit list may be transmitted from the broadcasting station via a suitable communication line to enable use of the collected materials in broadcasting.

In the above-described process, in the viewer 4, editing can be executed by a simple processing procedure of only reproducing data from optical disc 3 and recording an edit list in response to the operation of the operating buttons and control commands from the personal computer 5. On the other hand, in the personal computer 5, the overall operation is controlled by an application program constructed on an operating system on the market. In this operating system, therefore, a program can easily be formed for processing in each of the viewer 4 and the personal computer 5, and can easily revised for version up. The personal computer 5 may be changed as desired to improve the facility with which the computer is operated by an operator.

On the personal computer 5 side, a simple editing process is executed by operating the pointing device 45 provided in the viewer 4 in association with the GUI displayed on the display 77 on the assumption that the personal computer 5 and the viewer 4 are used in a state of being connected to each other. Therefore, editing can be performed easily even in a restricted environmental space not large enough to operate a pointing device, e.g., a mouse. That is, to move a set of apparatuses between news gathering places or the like, the set of apparatus is ordinarily mounted on a motor vehicle capable of a small turn or easy to drive. It is probable that such a motor vehicle lacks a space large enough to operate a mouse or the like. In this embodiment of the present invention, however, editing can be easily performed if only a space for placement of the viewer 4 and the personal computer 5 is provided.

(1-3) Advantages of the First Embodiment

In the editing system arranged as described above, an information recording surface of an optical disc is divided into concentric areas mainly forming a system data area and a user area, and data for management of files and data of an edit list are recorded in the system data area. A common disc-like recording medium formed of such an optical disc can be used from collection of materials with television camera 2 to editing to record the corrected materials, to enable editing, and to enable the collected materials to be promptly edited and brought back to a broadcasting station. Thus, the editing system of the present invention is capable of processing collected materials more efficiently than the conventional system.

In the reproducing system from the optical pickup operation of viewer 4 to signal processing, a system for reproducing digital audio signals is formed independent of a system for reproducing digital video signals. Therefore, editing can be performed by using a simple process for combining digital video signals and digital audio signals of different scenes, and the results of such editing can easily be confirmed.

Since the recording areas is divided into concentric areas for recording digital video and audio signals, digital video and audio signals can be efficiently reproduced by being reproduced through independent reproducing systems formed as described above.

(2) Second Embodiment

Figure 14:
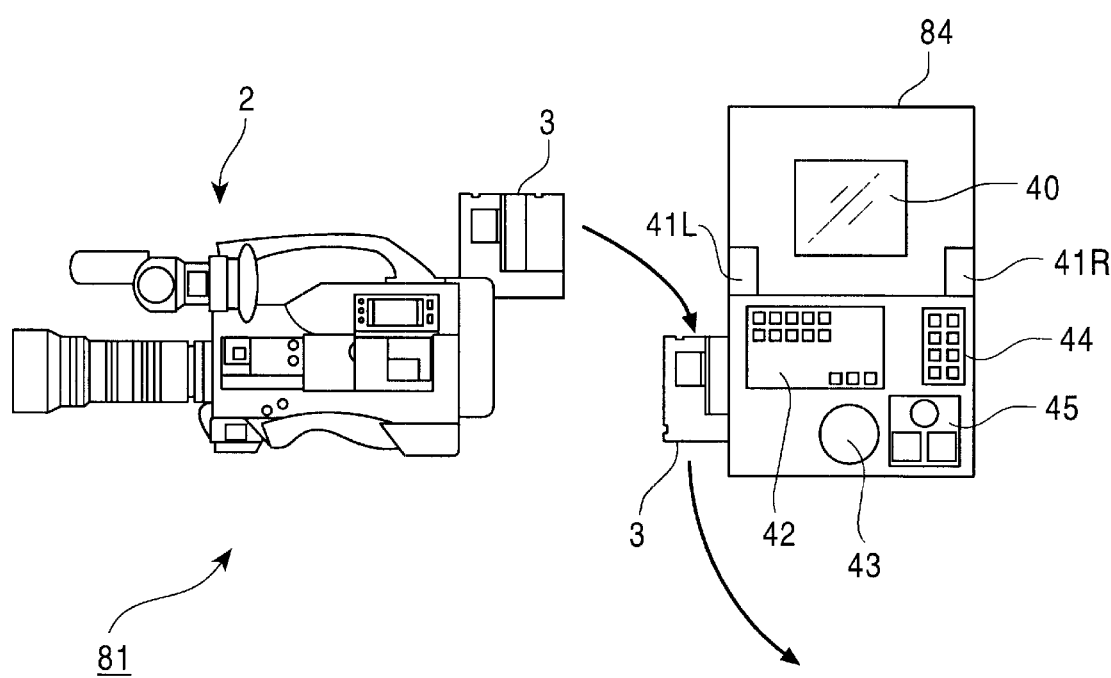
FIG. 14 is a plan view of an editing system which represents a second embodiment of the present invention.

FIG. 14 is a plan view of en editing system 81 which represents a second embodiment of the present invention. In this editing system 81, collected materials recorded on optical disc 3 are edited in a viewer 84. The same components of the second embodiment editing system 81 as those of the first embodiment editing system 1 are indicated by same reference numerals, and the description for them will not be repeated.

Figure 15:
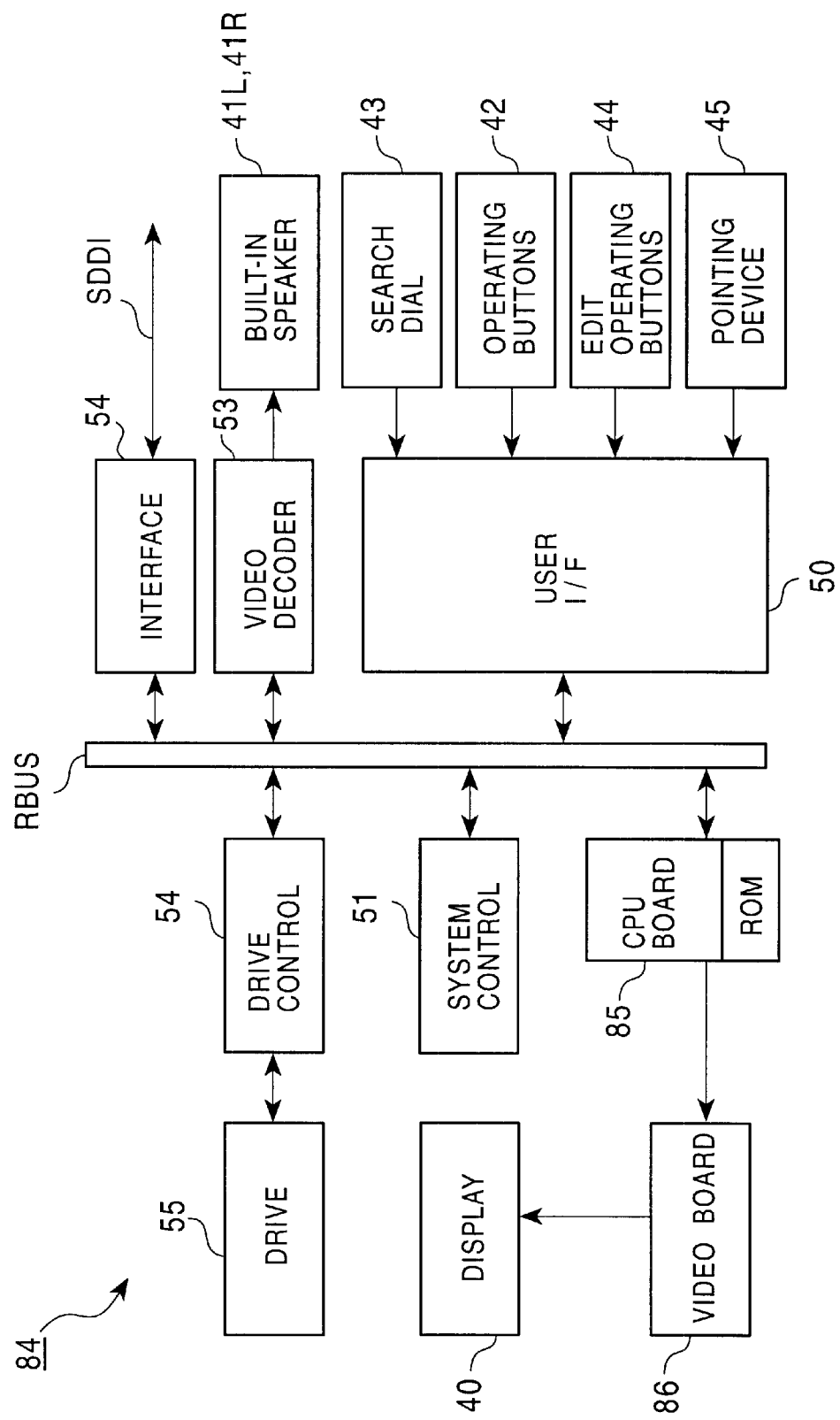
FIG. 15 is a block diagram of a viewer used in the editing system shown in FIG. 14.

FIG. 15 is a block diagram of the viewer 84. This viewer 84 is formed by adding a CPU board 85 and a video board 86 to the arrangement for the first embodiment. That is, the CPU board 85 has a central processing unit, a read only memory (ROM) in which an operating system for the central processing unit, an application program and the like are stored, and a random access memory forming a work area for the central processing unit. The CPU board 85 have functions corresponding to those of the personal computer 5 described above with reference to FIG. 12.

The video board 86 displays images reproduced from optical disc 3, still images, edit windows, etc. on the display 40 under the control of the CPU board 85. Therefore, the video decoder 53 does not directly drive the display 40 by a demodulated digital video signal. Instead, the video decoder 53 outputs the demodulated digital video signal to the video board 86.

Figure 16:
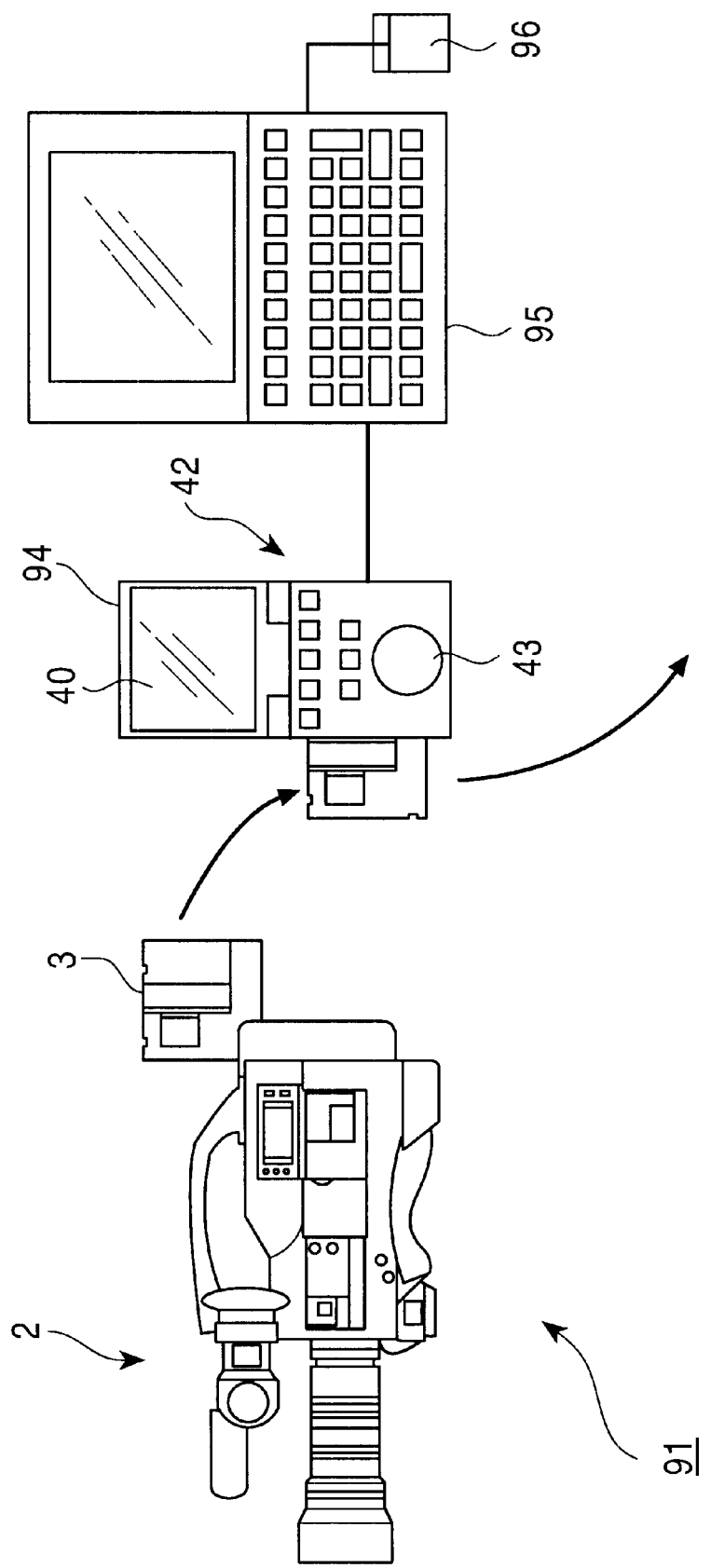
FIG. 16 is a plan view of an editing system which represents a third embodiment of the present invention.

In the system arranged as shown in FIGS. 15 and 16, the viewer 84 also have editing functions corresponding to those of the personal computer 5 and can therefore edit data on optical disc 3 by operating alone. Therefore, an operator can execute editing by placing the viewer 84, for example, on his or her lap in a material collecting place. Also, the configuration of the entire system can be simplified.

Since there is no need for connection to any personal computer, operating failure or the like depending on matching with a personal computer can be effectively avoided.

(3) Third Embodiment

FIG. 16 is a plan view of en editing system 91 which represents a third embodiment of the present invention. In this editing system 91, collected materials recorded on optical disc 3 are edited in a viewer 94 connected to a personal computer 95. The same components of the third second embodiment editing system 91 as those of the first embodiment editing system 1 are indicated by same reference numerals, and the description for them will not be repeated.

In the viewer 94, only a search dial 43 and standard operating buttons 42 are arranged in the operating panel.

Figure 17:
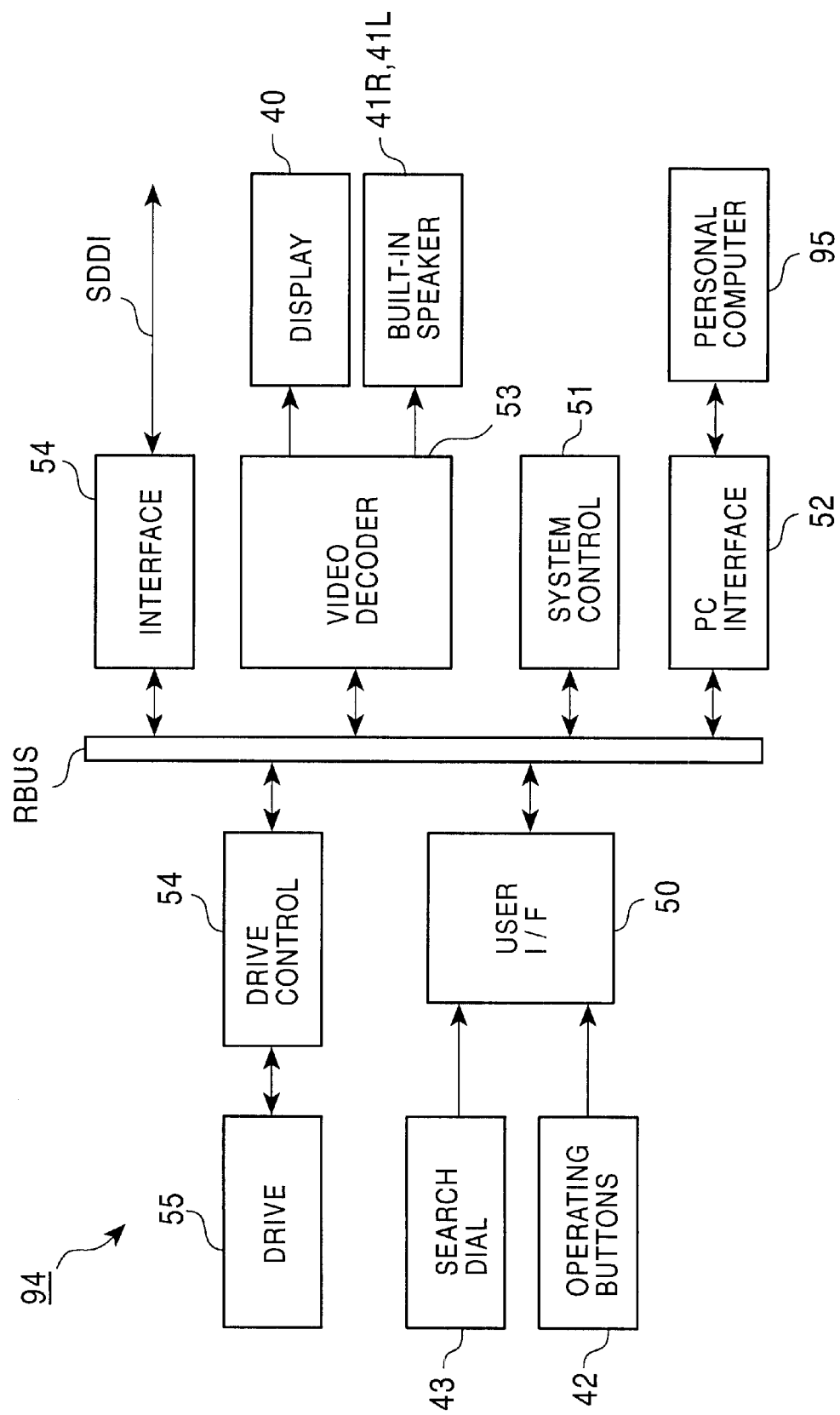
FIG. 17 is a block diagram of a viewer used in the editing system shown in FIG. 15.

FIG. 17 is a block diagram of the viewer 94. The viewer 94 informs a system control 51 of the operations of the search dial 43 and the standard operating buttons 42 via the user interface 50. The viewer 94 itself can only confirm collected materials recorded on optical disc 3.

Figure 18:
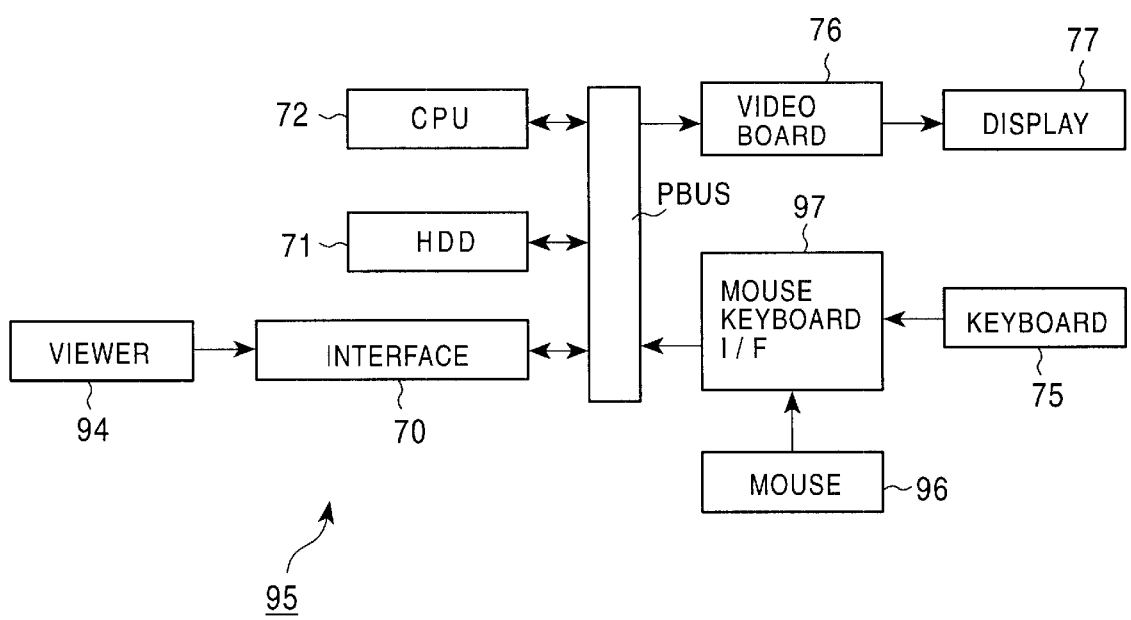
FIG. 18 is a block diagram of a personal computer used in the editing system shown in FIG. 15.

FIG. 18 is a block diagram of the personal computer 95. The personal computer 95 is arranged so as to be capable of recognizing the operations of a keyboard 75 and a mouse 96 through a mouse keyboard interface 97. The personal computer 95 can set still images displayed on the viewer 94 at in and out points by the operations of the keyboard 75 and the mouse 96. The personal computer 95 makes an edit list by editing the thus-selected editing objects by the GUI operation described above with reference to FIG. 13, and instructs the viewer 94 to record this edit list. Thus, in this editing system, the construction of the viewer 84 is simplified while the mouse 96 of the personal computer 95 is made usable as a pointing device.

In the system arranged as shown in FIGS. 16 to 18, the mouse of the personal computer is used as a pointing device to enable the viewer to be further simplified in construction.

(4) Fourth Embodiment

Figure 19:
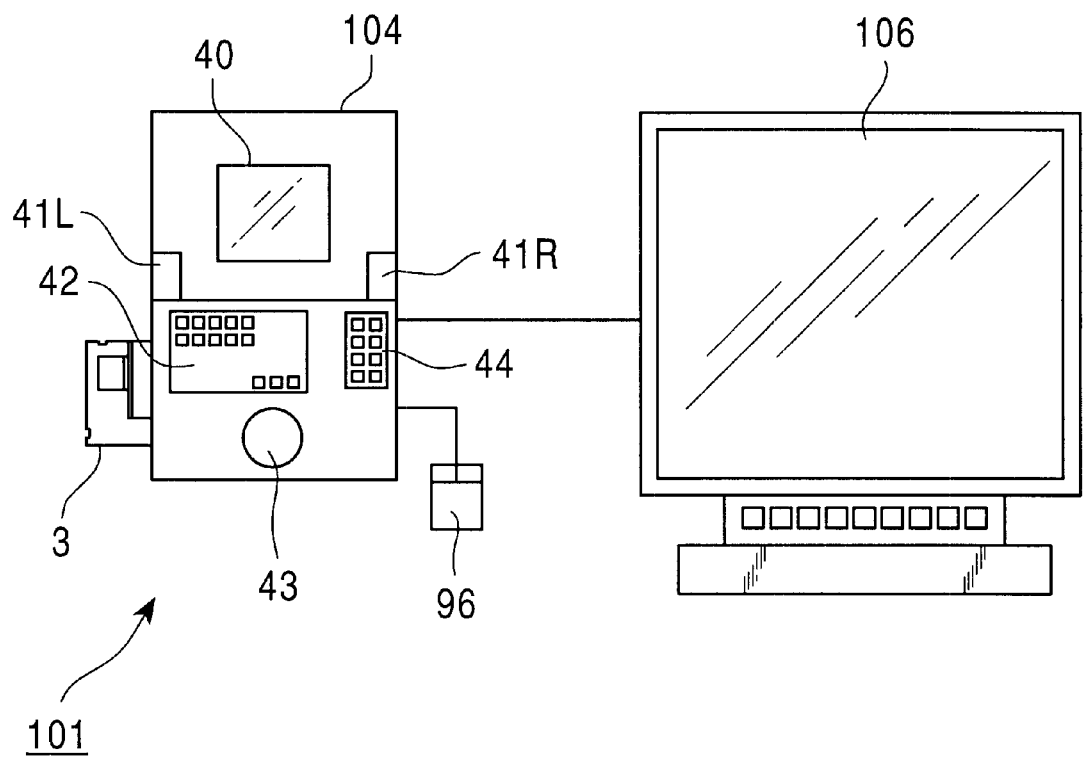
FIG. 19 is a plan view of an editing system which represents a fourth embodiment of the present invention.

FIG. 19 is a plan view of en editing system 101 which represents a fourth embodiment of the present invention. In this editing system 101, a viewer 104 executes editing by operating alone, and results of editing and collected materials are confirmed on a display 106. The same components of the fourth embodiment editing system 101 as those of the first embodiment and second embodiment editing systems 1 and 81 are indicated by same reference numerals, and the description for them will not be repeated.

In the viewer 104, a search dial 43, standard operating buttons 42 and edit operating buttons 44 are arranged in the operating panel. A mouse 96 provided as a pointing device is connected to the viewer 104.

Figure 20:
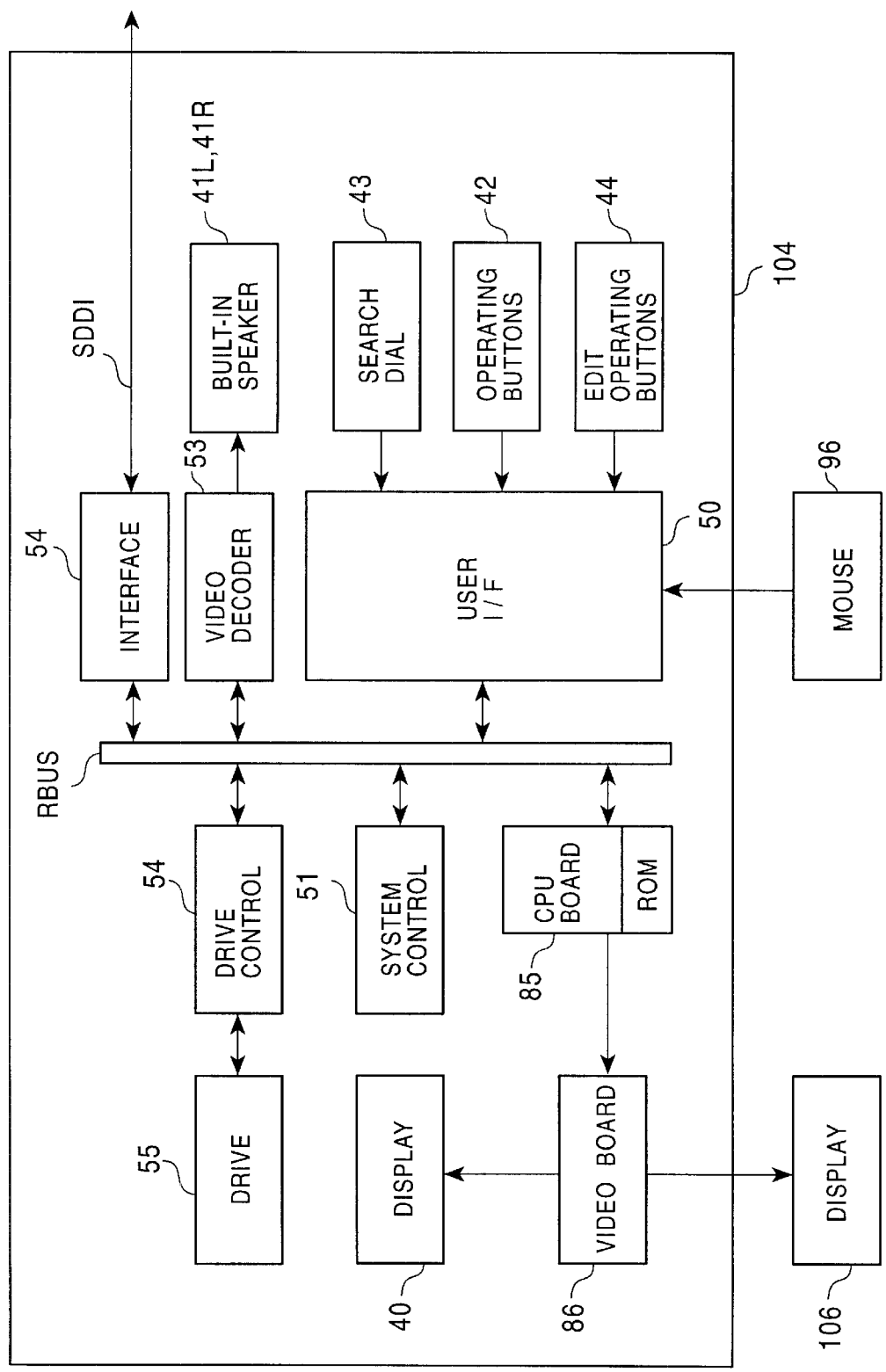
FIG. 20 is a block diagram of a viewer used in the editing system shown in FIG. 19.

FIG. 20 is a block diagram showing the entire configuration of the viewer 104. The viewer 104 recognizes the operation of the mouse 96 as well as the operations of the operating buttons through a user interface 50. In the viewer 104, a central processing unit mounted on a CPU board 85 executes a predetermined application program stored in a read only memory to execute a sequence of editing operations. In the viewer 104, results of demodulation performed by a video decoder 53 are displayed on the display 106 by a video board 86.

The system arranged as shown in FIGS. 19 and 20 and using a mouse as a pointing device to enable the viewer to perform editing by operating alone is as advantageous as the above-described second embodiment. If a mouse is used as a pointing device for the viewer, the viewer can have an ordinary configuration, so that the facility with which the system is maintained is improved.

(5) Other Embodiments

Figure 21:
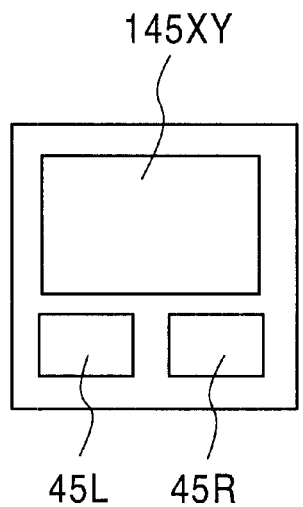
FIG. 21 is a plan view of a pointing device used in a further embodiment of the present invention.
Figure 22:
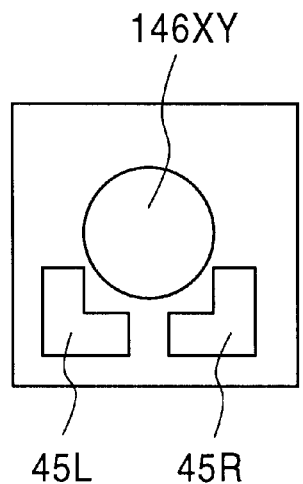
FIG. 22 is a plan view of a pointing device using a track ball.

In the above-described first and other embodiments, a pointing device formed of pressing force detection means is disposed in the operating panel of the viewer. The present invention, however, is not limited to this. A pointing device using a touch panel 145XY such as shown in FIG. 21, a pointing device using a track ball 146XY such as shown in FIG. 22, or any other pointing device may alternatively be used.

The embodiments have been described with respect to the case where digital video signals are edited by cut-editing. However, this editing method is not exclusively used, and the present invention can be applied to other various editing operations.

The embodiments have also been described with respect to the case where a digital video signal in one channel and digital audio signals in four channels are edited. According to the present invention, however, the number of channels for digital audio signals can be set to any other number according to need.

The embodiments have also been described with respect to the case where digital video and audio signals are recorded from the outer end of an optical disc. According to the present invention, however, recording may be started from an inner position if a sufficient long seek time can be set.

In the above-described embodiments, digital video signals and the like are recorded by driving the optical disc on the condition of rotation at a constant linear velocity, and signals are reproduced from the optical disc on the condition of rotation at a constant angular velocity. The present invention, however, is not limited to this system. For example, if an optical disc is used as a disc-like recording medium and if the optical disk can have a sufficiently large recording capacity, the optical disc can be driven on the condition of rotation at a constant angular velocity both for recording and for reproduction. Also, even in a case where a phase-change optical disc is used, the optical disc can be driven on the condition of rotation at a constant angular velocity both for recording and for reproduction provided that the desired data recording can be reliably performed by laser light quantity control regardless of the difference between linear velocities at inner and outer positions.

In the above-described embodiments, the optical disc is accessed with one pair of optical pickups in the television camera and with two pairs of optical pickups in the viewer. The present invention, however, is not limited to this arrangement. If a practically sufficient transfer rate can be set, the optical disc may be accessed with one optical pickup disposed on one side in the television camera and with two optical pickups disposed on one side in the viewer.

In the above-described embodiments, the personal computer and the viewer are connected by one interface. However, the arrangement may alternatively be such that, for example, an interface for digital video signals only and another interface for digital audio signals only are provided between the personal computer and the viewer.

In the above-described embodiments, the viewer reproduces data from the optical disc. However, the arrangement may alternatively be such that, for example, data is reproduced from the optical disc by a personal computer having a similar optical disc drive, and the reproduced data is edited by the personal computer. In this case, the computer corresponds to the editing apparatus.

In the above-described embodiments, digital video and audio signals recorded by the television camera are edited. The present invention, however, can also be applied to the processes of editing digital video and audio signals recorded by other various kinds of video apparatuses.

In the above-described embodiments, a digital video signal is compressed into data in an MPEG format to be recorded on the optical disc. The present invention, however, can also be applied to the processes of recording after compressing data by other various methods.

In the above-described embodiments, digital video and audio signals are recorded on a phase-change optical disc capable of recording on both surfaces. However, this type of optical disc is not exclusively used. According to the present invention, an magneto-optic disc capable of recording on both surfaces, a write-once type optical disc, etc. may also be used. If such a disc can have a sufficiently large capacity, only one surface of the disc may be used.

According to the present invention, as described above, data for management of digital video and audio signals and data of an edit list are recorded on a disc-like recording medium together with the digital video and audio signals. Collected materials can be processed on a such a common disc-like recording medium from an image pickup apparatus to an editing apparatus. Thus, the system of the present invention is capable of processing collected materials more efficiently than the conventional system. Correspondingly, the handling of this kind of system can be improved.

What is claimed is:

1. An image pickup apparatus comprising:

image pickup means for forming an image of a desired object and for forming a video signal;

audio signal input means for inputting an audio signal corresponding to the video signal; and recording means for detachably holding a rewritable disc recording medium and for recording the video and audio signals on the rewritable disc recording medium, wherein an information recording surface of the disc recording medium is divided into at least two concentric areas, one of the divided concentric areas including an edit list recording area and a management data recording area, each of the edit list recording area and the management data recording area being provided within separate concentric areas associated with said one of the divided concentric areas, the video signal and the audio signal being recorded in the divided concentric area other than said one of the divided concentric areas including the edit list recording area and the management data recording area, management data for management of the video and audio signals being recorded in the management data recording area, data of an edit list for editing the video and audio signals recorded on the rewritable disc recording medium being recorded in the edit list recording area in a predetermined editing apparatus in which the rewritable disc recording medium is loaded.

2. An image pickup apparatus according to claim 1, wherein the disc recording medium comprises an optical disc.

3. An image pickup apparatus according to claim 1, wherein the divided areas of the disc recording medium other than said one of the divided areas including the edit list recording area and the management data recording area is divided into a plurality of concentric areas, which are alternately assigned to recording of the video signal and to recording of the audio signal.

4. An editing apparatus comprising:

reproducing means for reproducing a video signal and an audio signal from a rewritable disc recording medium detachably held;

edit list forming means for forming an edit list for editing the video and audio signals recorded on the rewritable disc recording medium by accepting an operator's operation on the video and audio signal reproduced by said reproducing means; and recording means for recording the edit list on the rewritable disc recording medium, wherein an information recording surface of the disc recording medium is divided into at least two concentric areas, one of the divided concentric areas including an edit list recording area and a management data recording area, each of the edit list recording area and the management data recording area being provided within separate concentric areas associated with said one of the divided concentric areas, the video and audio signals being recorded in the divided concentric area other than said one of the divided concentric areas including the edit list recording area and the management data recording area, management data for management of the video and audio signals being recorded in the management data recording area, said reproducing means reproducing the video and audio signals based on the management data, said recording means recording the edit list in the edit list recording area.

5. An editing apparatus according to claim 4, wherein said reproducing means includes:

a video signal reproducing system for reproducing the video signal from the disc recording medium; and an audio signal reproducing system which performs seeking independent of said video signal reproducing system to reproduce the audio signal from the audio signal from the disc recording medium.

6. An editing apparatus according to claim 4, wherein the disc recording medium comprises an optical disc.

7. An editing apparatus according to claim 4, wherein the divided areas of the disc recording medium other than said one of the divided areas including the edit list recording area and the management data recording area is divided into a plurality of concentric areas, which are alternately assigned to recording of the video signal and to recording of the audio signal.

8. An editing system comprising:

an image pickup apparatus which detachably holds a rewritable disc recording medium, and records, on the rewritable disc recording medium, a video signal obtained by forming an image of a desired object and an audio signal obtained simultaneously with the video signal; and an editing apparatus which detachably holds the rewritable disc recording medium, reproduces the video and audio signal recorded on the rewritable disc recording medium by said image pickup apparatus, makes an edit list for editing the video and audio signals, by an operator's operation based on the reproduced video and audio signals, and records the edit list on the rewritable disc recording medium, an information recording surface of the rewritable disc recording medium being divided into at least two concentric areas in said image pickup apparatus, one of the divided concentric areas including an edit list recording area and a management data recording area, each of the edit list recording area and the management data recording area being provided within separate concentric areas associated with said one of the divided concentric areas, the video signal and the audio signal being recorded in the divided concentric area other than said one of the divided concentric areas including the edit list recording area and the management data recording area in said image pickup apparatus, management data for management of the video and audio signals being recorded in the management data recording area in said image pickup apparatus, the edit list being recorded in the edit list recording area in said editing apparatus.

9. An editing system according to claim 8, wherein the disc recording medium comprises an optical disc.

10. An editing system according to claim 8, wherein the divided areas of the disc recording medium other than said one of the divided areas including the edit list recording area and the management data recording area is divided into a plurality of concentric areas, which are alternately assigned to recording of the video signal and to recording of the audio signal.

* * * * *

UNITED STATES PATENT AND TRADEMARK OFFICE
CERTIFICATE OF CORRECTION

PATENT NO. : 6,636,687 B1 Page 1 of 1
DATED : October 21, 2003
INVENTOR(S) : Ando et al.

It is certified that error appears in the above-identified patent and that said Letters Patent is hereby corrected as shown below:

<u>Title page,</u>
Please add:
-- [73] Assignee:  Sony Corporation, Tokyo (JP) --

Signed and Sealed this

Twentieth Day of January, 2004

JON W. DUDAS
*Acting Director of the United States Patent and Trademark Office*